Jan. 19, 1965 F. J. SPARACIO 3,166,737

ASYNCHRONOUS DATA PROCESSOR

Filed Dec. 23, 1960 10 Sheets-Sheet 1

INVENTOR
FRANK J. SPARACIO

BY Roy C. Hopgood
ATTORNEY

Jan. 19, 1965 F. J. SPARACIO 3,166,737

ASYNCHRONOUS DATA PROCESSOR

Filed Dec. 23, 1960 10 Sheets-Sheet 2

ASYNCHRONOUS DATA PROCESSOR

Filed Dec. 23, 1960 10 Sheets-Sheet 3

United States Patent Office 3,166,737
Patented Jan. 19, 1965

3,166,737
ASYNCHRONOUS DATA PROCESSOR

Frank J. Sparacio, Poughkeepsie, N.Y., assignor to International Business Machines Corporation, New York, N.Y., a corporation of New York Filed Dec. 23, 1960, Ser. No. 77,921
39 Claims. (Cl. 340—172.5)

This invention relates to asynchronous data processors and, more particularly, to asynchronous data transfer systems.

Among modern data processing techniques which have been developed are techniques whereby logical operations are performed during time periods of fixed duration. These time periods, which are synchronously controlled, are generally determined on the basis of the maximum time which is theoretically required for a particular type of operation to be performed despite the fact that in practice the operation might actually require substantially less time.

To avoid the loss of data processing time which is implied by the above, asynchronous techniques are being considered according to which data processing operations are not assigned specific time periods, and according to which each of a sequence of operations is initiated as soon as the preceding operation is complete.

It is an object of the invention to embody asynchronous techniques in data transfer systems which are thereby adapted for processing data at maximum speeds.

In addition to the above, techniques have been employed whereby data is processed in both its true and complement form, which forms are checked against each other to determine whether or not an error has occurred during the handling of the data.

It is an object of the invention to combine this latter technique with asynchronous techniques in order to provide data processing operations which avoid the possibility of error, while at the same time realizing optimum data processing rates.

According to the invention, circuits are provided which will operate as fast as permitted by the time delays inherent in the components employed. Since the speed of these components is not really a limiting factor in the design of data processors, greater flexibility in design techniques becomes possible.

Furthermore, in various types of logical circuits such as adders and the like, the number of levels required to complete an average operation is substantially less than the number of levels required under theoretical or "worst case" conditions. The invention therefore contemplates the improvement of logical circuits to take full advantage of asynchronous controls.

Since, in accordance with the invention, no time base is required for data processing operations, and it is possible to permit operations to be completed in the exact time needed, data processing machines can be designed to take advantage of programs that involve many iterations along short logical routes. Moreover, the nature of the techniques embodied by the invention is such that slow components will not cause errors, but will involve only a slowing of the data processing operation.

According to the invention, control and timing operations may all be effected through the use of standard logical components as well as by the use of direct-coupled logic which may inherently prove more reliable than systems involving pulses.

Furthermore, the inherent nature of circuits provided in accordance with the invention is such that the connections between stages are of minimum length.

In further accordance with the invention, there are provided inherent checking features whereby an operation must be proved complete and correct before the apparatus can proceed to the next operation. Thus, propagation of an error is virtually impossible, although it is within the scope of the invention to provide circuits which permit the apparatus to continue operation after the recording of an error.

It is, in this regard, an object of the invention to provide constant supervision of the dynamic transfer of information through logical circuits and into registers which store this information.

A feature of the invention is the provision of checking and control circuits which must change state during any transfer of information so that, if any circuit is frozen in one state, this will automatically indicate a malfunctioning of the circuit. In fact, according to the invention, checking and control circuits are provided which are automatically monitored during each cycle of operation for detecting failures.

It is another object of the invention to provide a system wherein errors are immediately detected and localized in order to facilitate maintenance and repair.

In realizing the above and other of its objectives and advantages, the invention contemplates the operative association of asynchronous controls with logical circuits such as adders and the like. In order to realize an optimum time efficiency, these controls are preferably provided to respond to each change of output condition of the associated logical circuit and to effect controls in accordance with such changes. Accordingly, it is within the purview of the invention to provide logical circuits, for use with asynchronous controls, which are non-oscillatory in nature or, in other words, generate useful output signals at the first change in the condition thereof.

It is a further object of the invention to provide improved logical circuits adapted for handling simultaneously the true and complement forms of the data to be processed and which are adapted at the same time for operative association with asynchronous controls.

It is a further object of the invention to provide improved non-oscillatory logical circuits such as adders and the like.

Still another object of the invention is to provide improved logical circuits which indicate an inactive condition by the presence of like output signals at a plurality of output terminals and which indicate the presence of data when the signals at the output terminals become mutually exclusive.

It is still another object of the invention to provide a double-line, non-oscillatory adding circuit adapted for providing a serial carry and being further adapted for operation with asynchronous controls.

Briefly, in accordance with the invention, there is provided a data processor comprising logic means adapted for processing electronic signals which are employed to represent data, the logic means being adapted for propagating output signals representing processed data. The logic means is preferably non-oscillatory so that it efficiently exhibits processed data upon a first change of its output signals. According to a preferred embodiment of the invention, the data to be processed is supplied in the form of electronic signals by input means coupled to the logic means by gating devices which selectively couple the logic means to or isolate the logic means from the said input means.

In further accordance with the invention, means are provided to receive the processed data from the logic means, and asynchronous control means are employed which are responsive to the first change of signals generated by the logic means for controlling the gating of data into the logic means for processing purposes.

The control of the gating operation is an important feature of the invention which will be described hereinafter in substantially greater detail along with other objects, features and advantages of the invention, some preferred embodiments of which are illustrated in the accompanying drawing wherein:

FIGS. 6–10 are, respectively, sections of a composite block diagram wherein:

FIG. 6 is a block diagram of one input section of said adder;

FIG. 7 is a block diagram of another input section of said adder;

FIGS. 8 and 9 are block diagrams of that portion of the adder in which the adding operation is performed; and FIG. 10 is a block diagram of the output section of the adder.

The invention will next be explained in relation to a system comprising a sequence of storage stages interconnected by logic circuits. With respect to this and other similar systems, it is to be noted that a further feature of the invention involves the provision of interlocked asynchronous controls which keep transfer operations between the various storage stages coordinated with one another. The interlocked asynchronous controls will, for example, insure that new and valid data is being transmitted from an Nth storage stage to the $N$th+1 storage stage.

More particularly, the asynchronous controls will insure the following conditions for each transfer of data:

(1) that a storage stage N has new and valid data to send to storage stage $N+1$;

(2) that storage stage $N+1$ is ready to accept this new data (this implies that the data present in storage stage $N+1$ has been successfully sent to storage stage $N+2$);

(3) that the logic circuit between storage stage N and storage stage $N+1$ has been flushed (i.e., has become devoid of data) since the last transmission of valid data from storage stage N to storage stage $N+1$.

Figure 1:
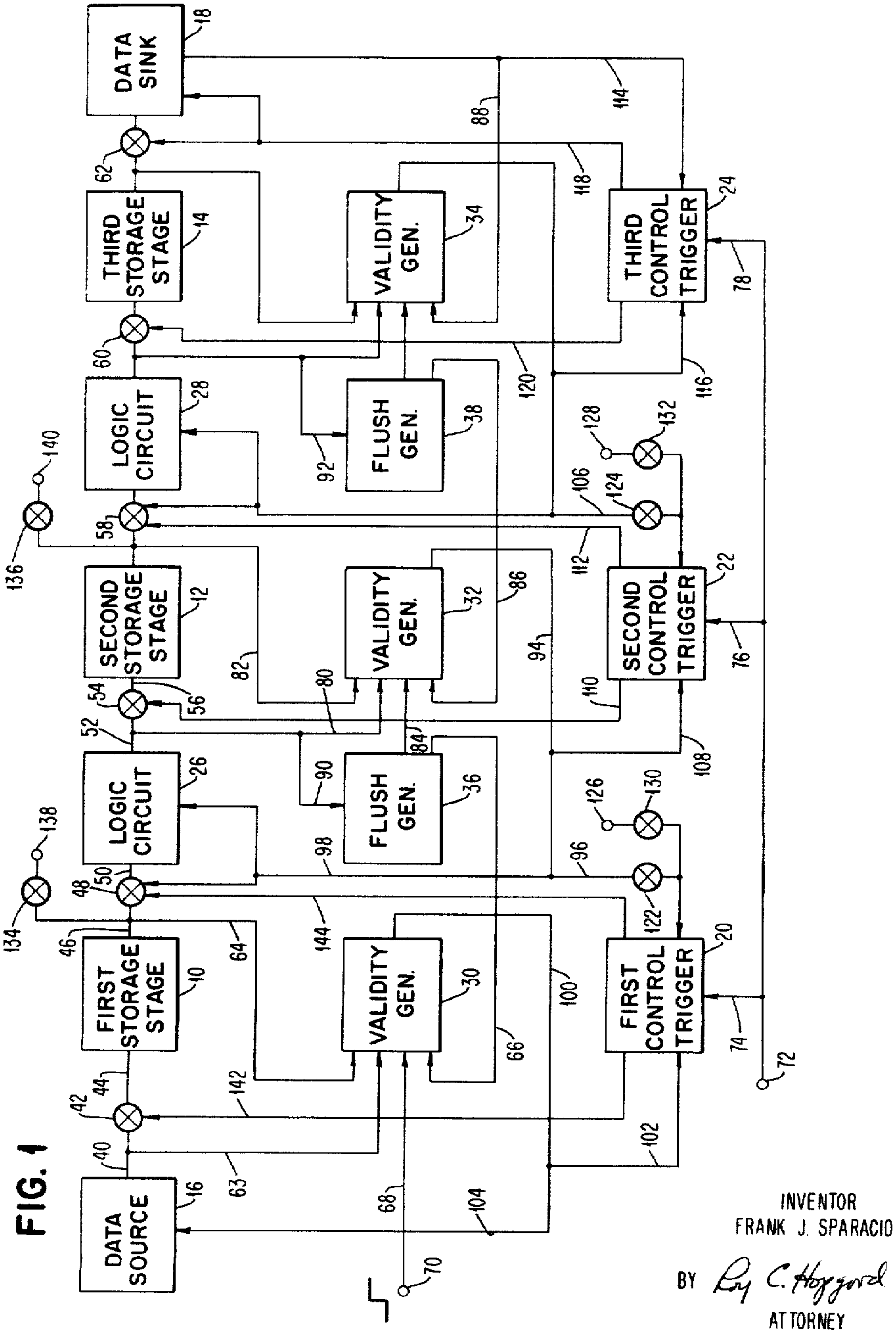
FIG. 1 is a block diagram illustrating the techniques and principles of an asynchronous control provided in accordance with the invention.

The data processing apparatus illustrated in FIG. 1 comprises, in accordance with the above, a first storage stage 10, a second storage stage 12 and a third storage stage 14. Also comprised in this apparatus are a data source 16, a data sink 18, and first, second and third control triggers 20, 22 and 24.

Between storage stages 10 and 12 is a logic circuit 26 and between storage stages 12 and 14 is a logic circuit 28. In further accordance with the invention, there are also provided validity generators 30, 32 and 34 and flush generators 36 and 38.

Data source 16 is coupled via line 40 to a gating device 42 and thence via line 44 to storage stage 10. Storage stage 10 is coupled via a line 46 to a gating device 48 and thence via a line 50 to logic circuit 26. Logic circuit 26 is coupled via line 52 to a gating device 54 and thence via line 56 to storage stage 12.

Similarly, storage stage 12 is coupled via gating device 58 to logic circuit 28, which is in turn coupled via gating device 60 to storage stage 14. Storage stage 14 is coupled via gating device 62 to data sink 18.

Each of the validity generators is associated with one of the aforenoted storage stages. More particularly, validity generator 30 is associated with storage stage 10, generator 32 is associated with storage stage 12 and generator 34 is associated with storage stage 14.

The flush generators are each associated with one of the logic circuits. More particularly, flush generator 36 is associated with logic circuit 26 and flush generator 38 is associated with logic circuit 28.

Validity generator 30 receives input signals from data source 16 and storage stage 10 via lines 63 and 64 respectively. Generator 30 also receives an input signal from flush generator 36 via line 66 and, furthermore, receives a signal via line 68 from a terminal 70 which is coupled to a higher level external source which initiates the data transfer and processing operations.

Also indicated in FIG. 1 is a terminal 72 coupled via lines 74, 76 and 78 to control triggers 20, 22 and 24 respectively to provide for terminating operation of the illustrated circuit.

In a manner similar to that indicated above, for validity generator 30, validity generator 32 receives four input signals via lines 80, 82, 84 and 86. Lines 80 and 82 are respectively connected to logic circuit 26 and storage stage 12, whereas lines 84 and 86 are respectively connected to flush generator 36 and flush generator 38.

Validity generator 34 receives its input signals from logic circuit 28, storage stage 14 and flush generator 38, a fourth input signal being received via a line 88 from data sink 18.

Flush generators 36 and 38 respectively receive input signals from logic circuits 26 and 28 via lines 90 and 92.

The control trigger 20 receives an input signal from validity generator 32 via lines 94 and 96, the validity generator 32 also transmitting its output signal via line 98 to gate 48.

Control trigger 20 also receives an input signal from validity generator 30 via lines 100 and 102, the validity generator 30 also transmitting its output signal to data source 16 via line 104.

Control trigger 22 receives input signals via lines 106 and 108 from validity generators 34 and 32 respectively and trigger 22 transmits its output signals via lines 110 and 112.

In a similar manner control trigger 24 receives input signals via lines 114 and 116 and transmits output signals via lines 118 and 120.

A number of additional gating devices have been indicated in FIG. 1 to illustrate that external arbitrary controls can be effected if desired. For example, input signals transmitted via lines 96 and 106 to control triggers 20 and 22 can be arbitrarily blocked by gating devices 122 and 124. Similarly, arbitrary control signals can be applied to terminals 126 and 128 and controlled by gating devices 130 and 132.

Gating devices 134 and 136 respectively couple storage stages 10 and 12 to terminals 138 and 140 and indicate that data in these storage stages can be tapped from the system if desired.

Data source 16 can be any conventional source of data in the form of electronic signals which, as hereinafter will be indicated in greater detail, represents the true and complement forms of data which is to be transmitted and processed. Data source 16 may, for example, be a magnetic drum storage unit, a magnetic tape storage unit, a photoelectric scanning device, a data processor, or the like.

Storage stages 10, 12 and 14 are preferably bistable circuits such as triggers or flip flops which are especially adapted for operation with the binary system of numbers. Stages 10, 12 and 14 may be of like construction and are adapted for receiving and storing data in intelligible form, and are further adapted for transmitting the data in intelligible form as electronic signals. These storage stages are also preferably adapted for transmitting data in true and complement form.

Logic circuits 26 and 28 are circuits which have non-oscillatory outputs and are adapted to perform logical functions such as addition, subtraction, multiplication, recirculation or the like. In accordance with the preferred embodiment of the invention, these logic circuits are also adapted to process true and complement forms of the data.

Flush generators 36 and 38 are circuits which are sensitive to flushed conditions in logic circuits 26 and 28 for generating output signals which are transmitted to validity generators 32 and 34 in one direction and to validity generators 30 and 32 in the opposite direction. Validity generators 30, 32 and 34 are circuits which are sensitive to the receipt of valid data by the associated storage stages and to the valid conditions of the circuits transmitting data to these storage stages for generating output signals indicating that valid data has been received in the associated storage stages. It will be noted, as indicated above, that the different validity generators receive signals from the flush generators of the next sequential stage, thus providing for interlocking the different stages to coordinate the same.

The validity generators transmit output signals to the control triggers associated therewith and as well to the control trigger of the next preceding stage.

Control triggers 20, 22 and 24 are bistable circuits, the output signals of which are transmitted to the gates controlling the inputs to and the outputs from the associated storage stage. For example, control trigger stage 20 is coupled via lines 142 and 144 to gates 42 and 48 which respectively control the input to and the output from storage stage 10. Similarly, the remaining control triggers control the inputs to and the outputs from storage stages 12 and 14.

Assuming that control trigger 20 has assumed one of its stable conditions, control signals will be transmitted to gates 42 and 48 via lines 142 and 144 respectively. As will be indicated in greater detail hereinafter and with reference to FIGS. 2 to 4, control trigger 20 will, for this given stable state enable the transmission of data through gate 42, while preventing the transmission of data through gate 48. If this is the initial condition in control trigger 20, data will be fed from source 16 into storage stage 10 whereat this data will be stored in intelligible form. This data will not, however, be transmitted to logic circuit 26 which is isolated from storage stage 10 due to the signal applied to gating device 48 by control trigger 20 as aforesaid.

Since logic circuit 26 is being provided with no data, it is in a flushed condition provided that it is functioning properly and signals indicating this flushed condition will be received by flush generator 36 and validity generator 32 via lines 90 and 80, respectively.

Assuming that a start signal has been applied to terminal 70 and transmitted to validity generator 30 via line 68, the output signal generated by flush generator 36 and transmitted via line 66 to validity generator 30 will prime the latter. Validity generator 30, if the data received in the storage stage 10 is valid (as indicated through lines 63 and 64), will therefore generate an output signal which will be transmitted via lines 100 and 102 to control trigger 20 to change the stable state thereof; assuming validity generator 32 via line 94–96 allows this action, which it should properly allow at this time.

Upon assuming the second of its two stable states, control trigger 20 will enable gating device 48 and disable gating device 42. It is now impossible for source 16 to transmit data to storage stage 10, while at the same time it is made possible for storage stage 10 to transmit its data to logic circuit 26 and thence to storage stage 12.

Validity generator 32 responds to the accurate transmission of data to storage stage 12 by providing a signal which causes control trigger 20 to revert to its original stable state whereupon the operation concerning stage 10 repeats itself. In the meantime, however, control trigger 22 has assumed the second of its stable conditions and gating device 54 is disabled and gating device 58 enabled whereupon data is propagated via logic circuit 28 to the third storage stage 14.

The operation indicated above can be terminated at any time by means of an appropriate signal applied via terminal 72 to control triggers 20, 22 and 24.

The operation of the circuit illustrated in FIG. 1 has been described in very general terms. A more specific explanation of the operation of the asynchronous control of the invention will follow hereinafter. It is sufficient to note at this time, however, (1) that the storage stages are controlled by associated gates, which are in turn controlled by trigger stages, which in turn are controlled by flush and validity generators which reflect the conditions of the associated logic circuits and storage stages and (2) that no synchronous timing system is involved, data transfer taking place as soon as it is determined that the operation is proceeding properly.

Figure 2:
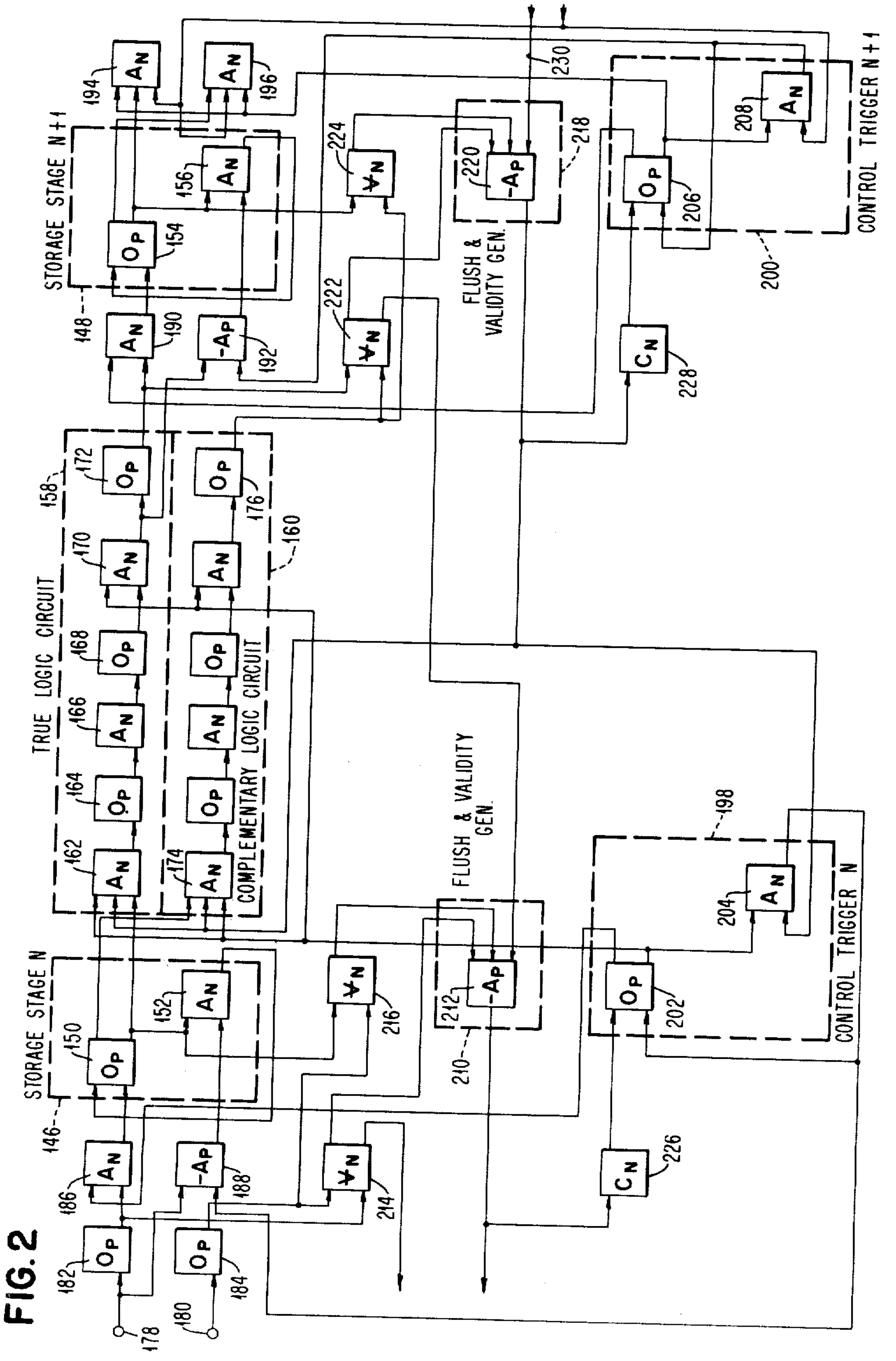
FIG. 2 is a block diagram of a specific form of asynchronous control developed from the block diagram of FIG. 1.

For a more detailed explanation of the asynchronous control techniques contemplated in accordance with the invention, reference is next made to FIG. 2, wherein is shown an asynchronous control for data transmission involving bipolar gating (two gates control the input to the logic circuit).

It is assumed that the logic circuits illustrated in FIG. 2 are of the non-oscillatory type (a matter which will be referred to in greater detail hereinafter) and thus provide with each change of output signal a useful output. This permits the flush and validity generators to respond to each change of signal which they sample and thus enables the initiating of subsequent operations at the earliest possible time.

It will also be assumed that the circuitry of FIG. 2 is of the direct-coupled logic type and that data is expressed therein by electronic signals and in true and complement binary form.

In FIG. 2 are illustrated storage stages N and $N+1$, indicated generally by reference numerals 146 and 148. Storage stage N comprises an or-gate 150 and an and-gate 152. Storage stage 148 comprises an or-gate 154 and an and-gate 156.

Between storage stages 146 and 148 is a logic circuit including a true logic circuit 158 adapted for processing the true form of data submitted thereto and a complementary logic circuit 160 adapted for processing the complement form of the data which is submitted thereto.

True logic circuit 158 includes and-gate 162, or-gate 164, and-gate 166, or-gate 168, and-gate 170 and or-gate 172 connected in series. Gate 162 is actually the gating device coupling storage stage 146 to true logic circuit 158 and controlling the transmission of data to the latter.

Complementary logic circuit 160 also consists of a sequence of alternating and-gates and or-gates of which and-gate 174 is the first and or-gate 176 the last.

Data is fed into the circuit of FIG. 2 via terminals 178 and 180 which respectively receive the data in true and complement forms. This data is transmitted via or-gates 182 and 184 respectively to and-gates 186 and 188, which respectively control the transmission of data in true and complement forms to storage stage 146.

Between logic circuits 158 and 160 and storage stage 148 are positioned and-gates 190 and 192. These gates control the transmission of data from said logic circuits to storage stage 148.

The output of storage stage 148 is controlled by and-gates 194 and 196 which respectively control the transmission of the true and complement forms of data from stage 148.

Associated with storage stage 146 is control trigger N generally identified by reference numeral 198. Associated with storage stage 148 is a control trigger $N+1$ generally identified by reference numeral 200.

Control trigger 198 comprises or-gates 202 and and-gate 204. Control trigger 200 comprises or-gate 206 and and-gate 208. The operation of stages 198 and 200 is similar to that of storage stages 146 and 148 and will be examined in greater detail hereinafter.

Also associated with storage stage 146 is flush and validity generator 210, which may be regarded as comprising a minus-and-gate 212 with which are operatively associated two exclusive-or-gates 214 and 216.

Associated with storage stage 148 is flush and validity generator 218 which may be regarded as including a minus-and-gate 220 operatively associated with which are exclusive-or-gates 222 and 224.

A convert block 226 connects flush and validity generator 210 to control trigger 198 and a convert block 228 couples flush and validity generator 218 to control trigger 200.

For an understanding of the operation of the above indicated circuitry, it is necessary to consider that data is processed therein in binary form so that only the two digits 0 and 1 need be represented. It need also be understood that the circuitry of FIG. 2 is constituted by a direct-coupled logic circuit, so that the digits 0 and 1 are represented by one of two levels of voltage. For purposes of simplification, it will be assumed hereinafter that the digit 1 is represented by a positive voltage and that the digit 0 is represented by a negative voltage. As is conventional in data processing apparatus, the control signals employed in this circuitry will also be similarly positive or negative.

Although not necessary to an understanding of the logical operation of the circuitry of FIG. 2, it will be assumed that the logical components which will be examined hereunder are drift transistor current switching circuits of either the N–P–N type or the P–N–P type as appears from the n and p notations employed in the logic blocks. In practice, n and p blocks are alternated in sequence; i.e., an n block is always coupled to a p block and a p block is always coupled to an n block.

To facilitate a ready comprehension of the logical function intended for the logic blocks of FIG. 2, these blocks have been appropriately legended in the drawing. The legends employed and the logical connotations are next examined hereinafter with reference to particular logic blocks which constitute example of the other blocks employed in the circuit of FIG. 2.

Block 170 (near the end of true logic circuit 158) is, for example, identified by the legend "A*n*." A*n* identifies an n-type and-gate. An and-gate functions to pass the most negative input signal applied to it and thus will pass a positive signal only when all of its input signals are positive.

Block 172 is identified by the legend "O*p*." The legend O*p* means that this logic component is a p-type or-gate which will pass the most positive signal applied to it. Thus or-gate 172 will pass a negative signal when all of the input signals applied thereto are negative and will pass a positive signal when any one of the input signals applied thereto is positive.

Block 192 is identified by the legend "-A*p*." Block 192 is a minus-and-gate and its function, as pertinent to the circuitry of FIG. 2, is to pass a minus signal only when all of the input signals applied thereto are negative.

Blocks 170, 172 and 192, which typify the similarly identified logic components in FIG. 2, may have any number of inputs. Their outputs are limited, however, in FIG. 2 to no more than two apiece. One of the two possible outputs for each of gates 170, 172 and 192 are those which are illustrated for these gates in FIG. 2. These outputs are located at the lower part of the associated blocks and are hereinafter designated as the in-phase outputs at which are exhibited the functions indicated above for these logical components. The upper outputs (see, for example, or-gate 202 which has lower and upper outputs) will hereinafter be designated as the "out-of-phase" outputs, at which appears the opposite of the signal appearing on the associated in-phase output. In other words, if a negative signal appears at the in-phase output of a logical component, a positive signal will appear at its out-of-phase output and vice-versa.

Block 222, for example, is identified by the legend "*n*." This legend indicates an exclusive-or-gate. If the input signals applied to an exclusive-or-gate are mutually exclusive (i.e., if one input signal is positive and the other negative or vice-versa), a positive signal will appear at the in-phase output of this gate and a negative signal will appear at the out-of-phase output of this gate. If, however, the input signals applied to an exclusive-or-gate are alike, a negative signal will appear at the in-phase output of this gate and a positive signal will appear in the out-of-phase output of this gate.

Block 228 is identified by the legend "C*n*" and is a convert block. The pertinent function of a convert block in the circuitry of FIG. 2 is to convert received signals from positive to negative and vice-versa. Thus, for example, when convert block 228 receives a negative signal, it transmits a positive output signal and, when the block receives a positive signal, it transmits a negative signal.

Storage stages 146 and 148 and control triggers 198 and 200 operate in substantially similar manner and it will be possible to understand the operation of all of these logical units from an examination of trigger 198.

Trigger 198, as noted above, comprises or-gate 202 and and-gate 204. One of the input signals for the or-gate 202 is supplied by convert block 226. The other input signal for or-gate 202 is provided by the in-phase output of and-gate 204 which is connected to or-gate 202 in feedback relationship. The in-phase output of or-gate 202 constitutes one of the input signals applied to and-gate 204, thus completing a closed loop. The other input of and-gate 204 originates externally of stage 198 and can be assumed to be either positive or negative.

Assuming that the externally originating signal constituting an input to gate 204 is negative, the in-phase output of gate 204 will be negative regardless of the signal transmitted to gate 204 by or-gate 202. The stage 198 will therefore have assumed one stable state in which the in-phase output of gate 204 will remain negative and the out-of-phase output of gate 204 (if there is one) would remain positive. The outputs of or-gate 202 would depend upon the signals supplied thereto by convert block 226.

Let it next be assumed that the external signal applied to gate 204 is positive. If a negative signal is fed from or-gate 202 to gate 204, control trigger 198 remains in the condition whereat a negative signal is transmitted from the in-phase output of gate 204. This condition will hereinafter be referred to as "off" or "reset."

If, however, or-gate 202 transmits a positive signal to gate 204 (as would occur upon the receipt of a positive signal from convert block 226), both inputs to gate 204 would then be simultaneously positive and gate 204 would produce at its in-phase output a positive signal which is recirculated to gate 202 such that the signal becomes self-sustaining. In stage 198 a condition has been achieved whereby the in-phase output of gate 204 remains positive and this condition will hereinafter be referred to as an "on" or "set" condition of state which is self-sustaining until a negative signal is applied to gate 204.

The above explanations can be applied to all of the logic components included in FIG. 2.

Referring next to the complementary logic circuit 160, this circuit has the same non-oscillatory properties as does the true logic circuit 158 but circuit 160 processes the ones complement of the binary data in the true circuit (i.e., when the true logic circuit contains a one the complementary logic circuit contains a zero and when the true logic circuit contains a zero, the complementary circuit contains a one).

The exclusive or-gate 222, for example, is connected between the outputs of logic circuits 158 and 160. This connection of gate 222 is used to detect a null condition in the logic circuitry, this null condition being the so-called "flushed" state.

More particularly, when the input gates 162 and 174 of logic circuits 158 and 160 are disabled, the outputs of these logic circuits both become negative. The in-phase output of exclusive-or-gate 222 will become negative and this will indicate a flushed state in logic circuits 158 and 160.

On the other hand, when the input gates 162 and 174 are enabled, the outputs of the logic circuits 158 and 160 should become mutually exclusive. In other words, one of the outputs should be positive and the other negative (since the logic circuits will be processing true and complement forms of the data supplied thereto). A mutually exclusive condition will exist at the inputs to exclusive-or-gate 222. Thus a positive signal will be generated at the in-phase output of gate 222 and a negative signal will be generated at the out-of-phase output thereof. These outputs of the exclusive-or-gate 222 indicate that valid data has been propagated in logic circuits 158 and 160.

Exclusive-or-gate 224 is connected between the output of the complementary logic circuit 160 and the output of or-gate 154 (and thus of storage stage 148). This is similar to the connection of exclusive-or-gate 216 and of similar gates which would be employed in other stages. When the input signals received by exclusive-or-gate 224 are mutually exclusive, this gate indicates that valid data has been transferred into the associated storage stage.

The minus-and-gate 220 (whose connection is similar to that of gate 212) receives its input signals from exclusive-or-gates 222 and 224 as well as from a line 230. Line 230 is connected to the flush generator of the next sequential stage (not shown). These inputs are "anded" together by gate 220 which produces a negative signal when all of the input signals applied thereto are negative. This indicates a flushed condition and valid data in the associated stage and a flushed condition in the next sequential stage.

Control triggers 198 and 200 are used to lock in and remember signals generated by the flush and validity generators.

The above information provides sufficient background for understanding the sequence of operations as next explained.

For purposes of this explanation, it will be assumed that control triggers 198 and 200 are off and that logic circuits 158 and 160 are being flushed and that the data in storage stage 146 is valid.

Since the data in storage stage 146 is valid, the inputs to exclusive-or-gate 216 are mutually exclusive and the out-of-phase output of this gate becomes negative. Since logic circuits 158 and 160 are flushed, gate 222 transmits a negative signal to minus-and-gate 212. As there is still data at terminals 178 and 180, the out-of-phase output of exclusive-or-gate 214 transmits a negative signal to minus-and-gate 212. A negative signal is therefore transmitted by minus-and-gate 212.

This negative signal is converted by convert block 226 to a positive signal and is applied to or-gate 202, thus setting control trigger 198. The in-phase output of or-gate 202 becomes and is maintained positive and this positive output is applied to gates 162 and 174 to enable the same.

At the same time, the out-of-phase output of or-gate 202 and the in-phase output of and-gate 204 are respectively applied to gates 186 and 188, thereby disabling these gates and the situation is such that data cannot be transmitted into storage stage 146, but that this storage stage can transmit the data therein to logic circuits 158 and 160.

The in-phase output of or-gate 150 is coupled to the true logic circuit 158, whereas the out-of-phase output of or-gate 150 is coupled to complementary logic circuit 160. This provides for the transmission of the true and complement forms of the data in storage stage 146 to the true and complementary circuits 158 and 160, respectively.

Control trigger 200 is still in its off condition. Consequently gates 190 and 192 are enabled respectively by the out-of-phase output of or-gate 206 and the in-phase output of and-gate 208. Thus, the logic circuits can transmit their data into storage stage 148.

When valid data has propagated into storage stage 148, the inputs to exclusive-or gate 224 become mutually exclusive and the out-of-phase output of this gate becomes negative. At the same time, assuming that the logic setting the next sequential storage stage (not shown) is flushed, a negative signal is applied via line 230 to minus-and-gate 220 and since a minus signal is being transmitted by the out-of-phase output of exclusive-or-gate 222 to gate 220, a negative signal is generated at the in-phase output of gate 220.

It should be noted that it is proper to assume that the signal on line 230 is negative inasmuch as the control trigger 200 is off so that gates 194 and 196 are disabled, this causing a flushed condition of the following logic circuit.

The generation of a negative signal at the in-phase output of minus-and-gate 220 initiates three operations in parallel.

First of all, this signal is transmitted to gates 162 and 174 to disable the same so that logic circuits 158 and 160 are flushed.

Secondly, control trigger 198 is turned off because of the negative signal applied to and-gate 204, this in turn restoring the originally assumed state in which gates 186 and 188 are enabled and locking in the condition whereby gates 162 and 174 are disabled.

Further, control trigger 200 is turned on, this disabling gates 190 and 192 and enabling gates 194 and 196.

By this time, valid data has again been fed into storage stage 146 and the logic circuits 158 and 160 become flushed. The inputs to gate 212 all become negative and the output signal produced by this gate becomes negative.

A complete transfer of data from storage stage 146 to storage stage 148 has been completed in a typical progression wherein the following steps can be observed:

(1) the data received by storage stage 146 is inspected and found valid and the logic circuits 158 and 160 are flushed;
(2) gates 186 and 188 are disabled and gates 162 and 174 are enabled;
(3) data propagates through logic circuits 158 and 160 into storage stage 148;
(4) the data received by storage stage 148 is inspected and found valid and initiates three operations:
    (i) logic circuits 158 and 160 are flushed;
    (ii) gates 190 and 192 are disabled and gates 194 and 196 are enabled;
    (iii) gates 186 and 188 are enabled and gates 162 and 174 are disabled.
(5) the logic circuits 158 and 160 are flushed and valid data is received by storage stage 146 and the transfer is completed.

Reference has heretofore been made to interlock provisions of the invention which coordinate the operation of the various stages. The validity and flush signals which have been indicated above are the signals by which the interlocking of the stages is provided so that in a pipe-line arrangement, such as has been indicated, interference between the stages can be avoided.

The flush signal generated by exclusive-or-gate 222 insures that logic circuits 158 and 160 are flushed before minus-and-gate 212 can generate a validity signal. The validity signal generated by minus-and-gate 220 insures that storage stage 148 has received the data stored in storage stage 146 before this latter storage stage can receive new data.

If for any reason a flush signal is not generated at a given stage, all data following the stage in which the malfunctioning has occurred will continue to propagate down the pipe-line. The transfer of data preceding the failure will, however, be halted. The associated control triggers will be frozen and will immediately localize the source of the error.

If for any reason the valid signal normally generated, for example, by minus-and-gate 220 is not produced, all data following this stage will continue to propagate down the pipe-line. All data in storage stage 148 and the preceding storage stages will be halted. The control trigger 200 will be frozen and localization of the error will thus be automatically provided.

Referring now to storage stage 148 and the associated circuitry, which are considered by way of example, it will be noted that exclusive-or-gates 222 and 224 respond immediately to any changes in signals in logic circuits 158 and 160 and in storage stage 148 itself. This permits an immediate initiation of the control signals contemplated in accordance with the invention. However, this necessitates that the first output signal change in logic circuits 158 and 160 be the correct change and this explains why the logic circuitry employed with the asynchronous controls of the invention is preferably of the non-oscillatory type (non-oscillatory logic will be dealt with in greater detail hereinafter).

It will also be appreciated from the above explanation that the controls are in fact asynchronous and that each operation in a sequence of operations is initiated immediately upon the completion of the preceding operation.

Attention is directed to the fact that in the circuitry of FIG. 2 provision has been made to expedite the initiation of each operation as soon as possible. For example, it will be noted that the validity signal transmitted by minus-and-gate 220 is forwarded both to the control trigger 198 and to the and-gates 162 and 174. The latter connection might be omitted, but is employed since it enables a flushing of circuits 158 and 160 immediately upon the generation of a validity signal by minus-and-gate 220. Thus, any delay inherent in the setting of control trigger 198 is avoided, although stage 198 is immediately thereafter employed to lock in the condition which causes a flushing of circuits 158 and 160.

Finally, an inspection of the interlocking feature of the invention reveals that minus-and-gate 220 can generate a validity signal only when it receives signals from exclusive-or-gates 222 and 224 indicating flushed and valid states and when, as well, a signal has been received via line 230 from the flush generator of the next sequential stage. This interlocking feature is important since the transmission of a validity signal by minus-and-gate 220 insures a setting of control trigger 200 which enables gates 194 and 196. If the interlocking feature were absent, there would be no guaranty that the subsequent logic circuits were flushed and the enabling of gates 194 and 196 might permit the transmission of data into logic circuits which already contained data of a different type.

From what has been stated above, it will appear that the logic circuits 158 and 160 are adapted for the handling of the true and complement forms of a single binary digit at a time. There will, however, be described hereinafter a more complete circuit in which pluralities of binary digits can be appropriately processed while employing the asynchronous control of the invention in operative association with a non-oscillatory logic circuit.

Figure 3:
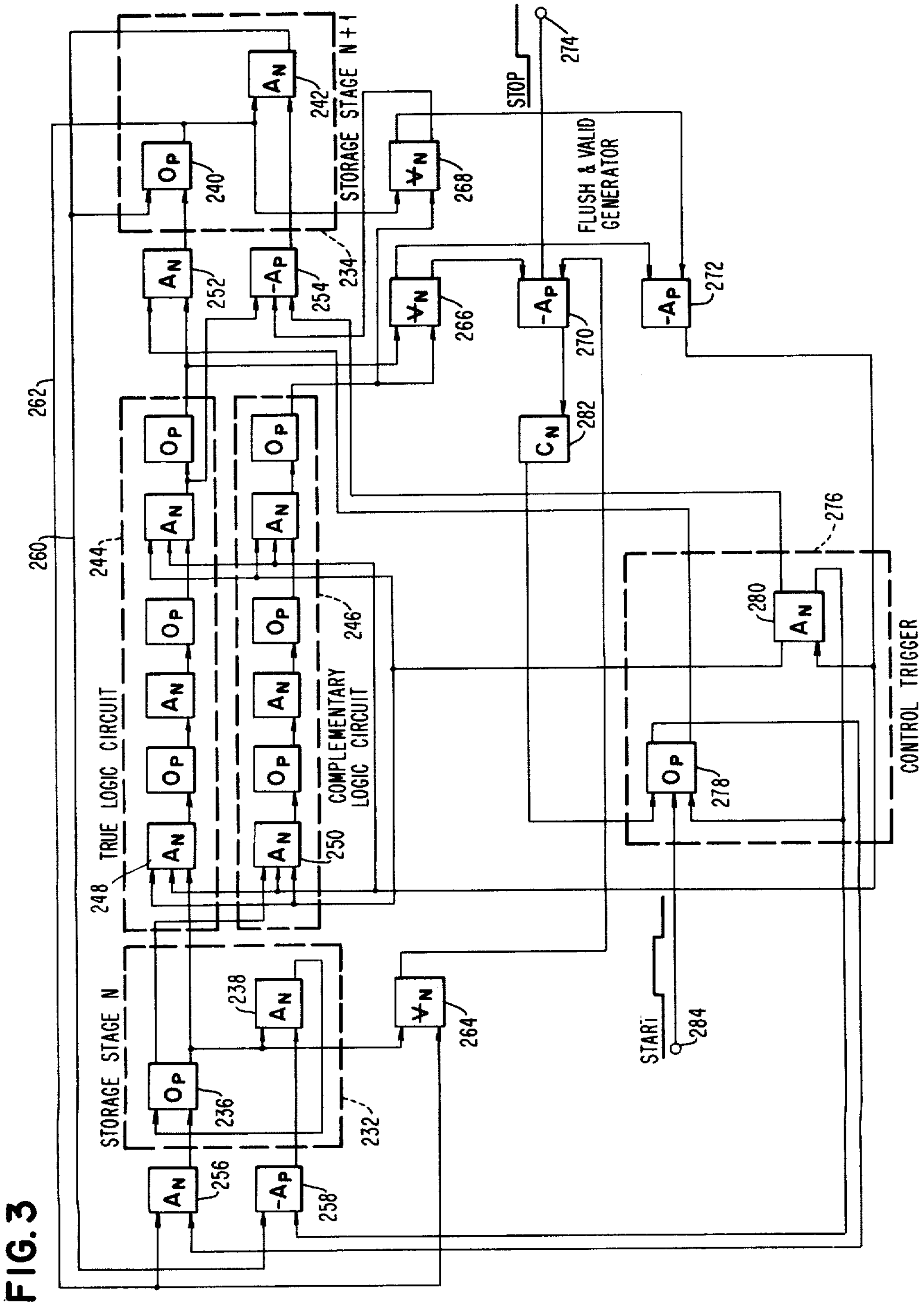
FIG. 3 illustrates a further specific form of asynchronous control developed from the block diagram of FIG. 1.

Reference will next be made to FIG. 3 wherein is illustrated an asynchronous control for a closed loop circuit and wherein are illustrated storage stages N and $N+1$ identified generally by reference numerals 232 and 234.

Storage stage 232 comprises an or-gate 236 and an and-gate 238 connected in feedback relationship and adapted to assume one of two stable states, as has already been explained in detail. Stage 234 similarly comprises an or-gate 240 and an and-gate 242, and is also adapted to assume one of two stable states.

Connected between stages 232 and 234 are a true logic circuit 244 and a complementary logic circuit 246.

And-gates 248 and 250 are the gates which control the transmission of data from storage stage 232 to circuits 244 and 246, and and-gate 252 and minus-and-gate 254 control the transmission of data from logic circuits 244 and 246 to storage stage 234.

The input to storage stage 232 is controlled by and-gate 256 and minus-and-gate 258, feedback lines 260 and 262 coupling the outputs of storage stage 234 to gates 256 and 258 to provide a closed loop.

The circuit of FIG. 3 includes exclusive-or-gates 264, 266 and 268. Exclusive-or-gate 264 is associated with storage stage 232 and receives its input signals from line 262 and from or-gate 236.

Exclusive-or-gates 266 and 268 are associated with logic circuits 244 and 246 and with storage stage 234 and constitute parts of a flush and validity generator.

Exclusive-or-gate 266 inspects the outputs of circuits 244 and 246 and, when these outputs are both negative (thus indicating flushed condition), gate 266 transmits a negative signal via its in-phase output and a positive signal via its out-of-phase output.

Exclusive-or-gate 268 compares the output of the complementary logic circuit 246 with the output of or-gate 240 and, when the same are mutually exclusive, transmits a positive signal via its in-phase output and a negative signal via its out-of-phase output.

The composite flush and validity generator further comprises minus-and-gates 270 and 272. The inputs to gate 270 are received from exclusive-or-gates 264 and 266 and, additionally, from a stop signal terminal 274.

The inputs to gate 272 are received from the out-of-phase outputs of the exclusive or-gates 266 and 268. Thus, when gates 266 and 268 detect mutually exclusive conditions, gate 272 transmits a negative signal.

The closed loop circuit further comprises a control trigger 276 which in turn includes an or-gate 278 and an and-gate 280. Gates 278 and 280 are connected in feedback relationship, as has already been described, to constitute a bistable device.

One of the inputs to or-gate 278 is received via a convert block 282 from the minus-and-gate 270. A second externally originating input can be received from a start signal terminal 284 to initiate the operation of this circuit.

For purposes of explanation, various initial conditions are assumed as follows:

First, it is assumed that exclusive-or-gate 264 transmits a negative signal.

Secondly, it is assumed that true logic circuit 244 and complementary logic circuit 246 are flushed so that exclusive-or-gate 266 transmits a negative signal via its in-phase output.

It is further assumed that the data in storage stage 234 is valid, so that a negative signal is transmitted from the out-of-phase output of exclusive-or-gate 268.

The output of gate 270 is thus assumed to have gone to the negative level.

The sequence of events which then transpires is next explained below.

The negative output of minus-and-gate 270 is reflected as a positive signal by convert block 282 which, in turn, functions to turn on the control trigger 276.

When the control trigger 276 is turned on, a positive signal is transmitted from gate 280 to minus-and-gate 258, thus disabling the same. At the same time, a negative signal is transmitted from the out-of-phase output of the or-gate 278 to and-gate 256 to disable this gate. Gates 256 and 258 are therefore both disabled.

Concurrently, the in-phase output of or-gate 278 transmits a positive signal to and-gates 248 and 250, thereby enabling these gates. The out-of-phase output of and-gate 280 transmits a negative signal to minus-and-gate 254, thus enabling the same, and the in-phase output of or-gate 278 transmits a positive signal to and-gate 252 to enable this gate.

As a result of the above operation, gates 256 and 258 are disabled and gates 248, 250, 252 and 254 are enabled.

The enabling of gates 248 to 254 permit the valid data in storage stage 232 to be propagated through logic circuits 244 and 246 into storage stage 234.

The propagation of valid data through logic circuits 244 and 246 will cause the outputs of these circuits to become mutually exclusive (i.e., one will be positive and the other negative, since they respectively handle the true and complement forms of the data). Accordingly, the out-of-phase output of exclusive-or-gate 266 will become negative.

Exclusive-or-gate 268 is, as noted above, coupled between the in-phase outputs of complementary logic circuit 246 and storage stage 234. Assuming the transmission of data to storage stage 234 is received satisfactorily, the inputs to exclusive-or-gate 268 will become mutually exclusive and the out-of-phase output of gate 268 will become negative.

The out-of-phase outputs of gates 266 and 268 are anded together by minus-and-gate 272. When the inputs to minus-and-gate 272 become negative, as indicated above, this gate transmits a negative signal. This negative signal is transmitted directly to gates 248 and 250 thereby disabling the same and initiating a flushing of logic circuits 244 and 246.

At the same time, this negative signal turns off control trigger 276 by reason of the application of this signal to and-gate 280.

The resetting of control trigger 276 locks in the flush operation initiated as noted above. This results from the transmission of a negative signal from the in-phase output of or-gate 278 to gates 248 and 250. It is to be noted that the out-of-phase output of and-gate 280 is positive and disables minus-and-gate 254. Gate 252 is disabled by or-gate 278.

Thus, as a result of the control trigger's going off, gates 256 and 258 are enabled and gates 248 to 254 are disabled.

More particularly, gate 256 receives a positive signal from the out-of-phase output of or-gate 278 and minus-and-gate 258 receives a negative signal from the in-phase output of and-gate 280.

Furthermore, gates 248 and 250 receive negative signals from the in-phase output of or-gate 278 and this negative signal is also applied to and-gate 252, whereas minus-and-gate 254 receives a positive signal from the out-of-phase output of and-gate 280.

Since gates 256 and 258 are enabled, data in storage stage 234 can be transferred to storage stage 232 via lines 260 and 262.

When the transfer of data into storage stage 232 is completed, mutually exclusive signals will be transmitted to exclusive-or-gate 264 and the out-of-phase output of this gate will become negative.

When the flush operation, which has been proceeding simultaneously with the data transfer, is completed, the inputs to exclusive-or-gate 266 both become negative and a negative signal appears at the in-phase output of gate 266.

The outputs of exclusive-or-gates 264 and 266 are anded together by minus-and-gate 270 and the output of gate 270 becomes negative, thus completing the transfer of data.

It should be noted that for starting the loop into operation, certain assumptions were made. If, in fact, these assumptions are incorrect, an external signal is required to initiate the operation. This signal may be a pulse of sufficient duration applied to terminal 284, which pulse will turn on control trigger 276.

An external signal is required to stop the operation. This signal should be a positive signal which is applied to terminal 274, which is connected to minus-and-gate 270.

Figure 4:
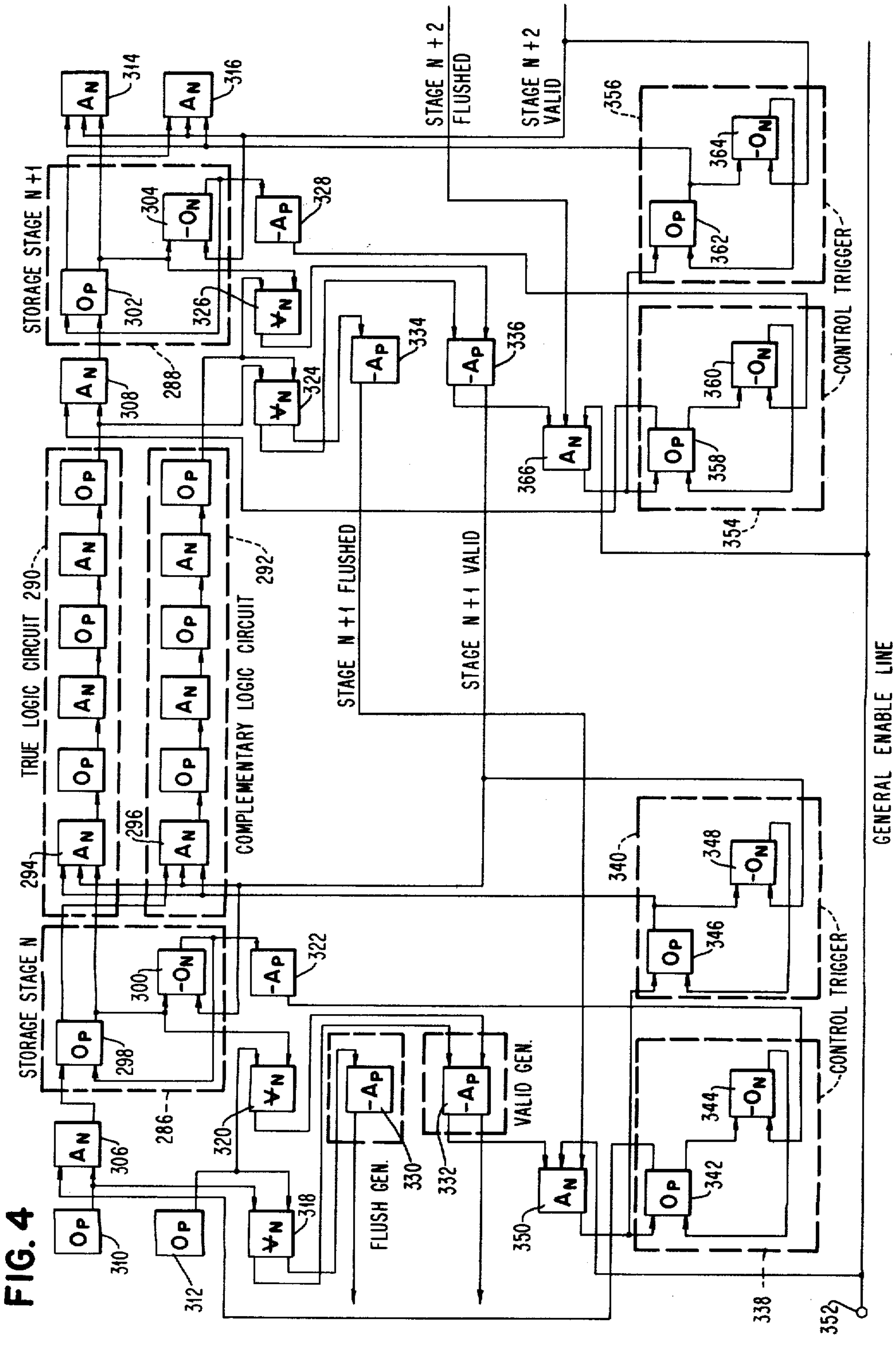
FIG. 4 illustrates still another form of asynchronous control based on the general diagram of FIG. 1.

Before reference is made to the details illustrated in FIG. 4, attention is first invited to the fact that FIG. 2 illustrates an asynchronous control for the transfer of data through a pipe-line having bi-polar gating. The bi-polar gating alludes to the provision of two gates at the input to the respective storage stages and, more particularly, to the fact that gates 186 and 188 are provided for storage stage 146 and gates 190 and 192 are provided for storage stage 148 in FIG. 2. The circuit illustrated in FIG. 4 incorporates an asynchronous control in accordance with the invention for the transfer of data through a pipe-line having unipolar gating. This alludes to the fact that each storage stage is preceded by a single gate which controls the entry of data.

The circuit of FIG. 4 comprises a storage stage N, generally identified by reference numeral 286, and a storage stage $N+1$ generally identified by reference numeral 288. These storage stages are two of a sequence of storage stages which may similarly be provided with asynchronous controls.

The circuit further comprises true logic circuit 290 and complementary logic circuit 292 which in turn include and-gates 294 and 296 which control the entry of data into the logic circuits and the flushing thereof.

As in the preceding circuits, the storage stages are trigger circuits. These trigger circuits are, however, slight modifications of the aforenoted trigger circuits in that, for example, storage stage 286 comprises an or-gate 298 and a minus-or-gate 300, the minus-or-gate 300, for purposes of explanation, performing in the same manner as an and-gate. Storage stage 288 similarly comprises an or-gate 302 and a minus-or-gate 304.

Controlling the inputs to storage stages 286 and 288 are and-gates 306 and 308 respectively, the use of the single gates giving the circuits its uni-polar gating characteristic.

The inputs of the circuitry of FIG. 4 are in the form of or-gates 310 and 312 and the output of storage stage 288 is controlled by and-gates 314 and 316.

Operatively associated with storage stage 286 are exclusive-or-gates 318 and 320 and the minus-and-gate 322 and operatively associated with storage stage 288 are exclusive-or-gates 324 and and 326, and minus-and-gate 328. The in-phase output of exclusive or-gate 318 is coupled to a minus-and-gate 330 which constitutes the flush generator of this stage and the out-of-phase outputs of exclusive or-gates 318 and 320 are anded together by minus-and-gate 332 which constitutes the validity generator of this stage.

The in-phase output of exclusive or-gate 324 is fed to a minus-and-gate 334 and the out-of-phase outputs of exclusive-or-gates 324 and 326 are fed to a minus-and-gate 336.

Control triggers 338 and 340 are provided for storage stage 286. Control trigger 338 includes an or-gate 342 and a minus-or-gate 344 and control trigger 340 includes an or-gate 346 and a minus-or-gate 348.

An and-gate 350 receives input signals from minus-and-gate 332, from an enable signal terminal 352 and from the flush generator constituted by minus-and-gate 334. And-gate 350 has its in-phase output connected to the inputs of or-gates 342 and 346.

Control triggers 354 and 356 are provided for storage stage 288. Control trigger 354 includes or-gate 358 and minus-or-gate 360 and control trigger 356 includes or-gate 362 and minus-or-gate 364.

An and-gate 366 is provided with input signals in a manner similar to that of and-gate 350. The in-phase output of and-gate 356 constitutes an input for or-gates 358 and 362.

For purposes of explaining the sequence of operations for the circuit of FIG. 4, it is assumed that logic circuits 290 and 292 are flushed and that, as a result, the out-of-phase output of minus-and-gate 334 is positive.

It is also assumed that valid data exists in storage stage 286 and that the in-phase output of minus-and-gate 332 is negative, so that the out-of-phase output of minus-and-gate 332 is positive.

A further assumption is that the trigger constituting storage stage 288 is off and it is further assumed that all control triggers are off.

Under the above assumed conditions, all inputs to and-gate 350 are positive since a positive signal will be transmitted to this gate from the terminal 352 if the circuit is to be rendered operative. The positive output of gate 350 turns on control triggers 338 and 340.

Control trigger 338 when in on condition disables and-gate 306 since the out-of-phase output of or-gate 342 constitutes an input to and-gate 306. Control trigger 340 when on enables and-gates 294 and 296 which are coupled to the in-phase output of or-gate 346.

With and-gates 294 and 296 enabled, the data in storage stage 286 propagates through logic circuits 290 and 292.

And-gate 308 is enabled since it is coupled to the out-of-phase output of or-gate 358 of control trigger 354 which is in off condition.

Gates 314 and 316 are disabled since they are coupled to the in-phase output of or-gate 362 of control trigger 356 which is also in off condition.

With the true and complement forms of the data in circuits 290 and 292, the outputs of these circuits are mutually exclusive and this is detected by exclusive-or-gate 324, the out-of-phase output of which will become negative.

When valid data is received in storage stage 288, the in-phase output of or-gate 302 and the output of logic circuit 292 will be mutually exclusive and this will be detected by exclusive-or-gate 326, the out-of-phase output of which will become negative. As the out-of-phase outputs of exclusive or-gates 324 and 326 are anded together by minus-and-gate 336, the out-of-phase output of the latter will become positive and the in-phase output of minus-and-gate 336 will become negative.

The out-of-phase output of gate 336 is connected to gate 366 which is thereby enabled.

Assuming that the next sequential stage is flushed, all inputs to gate 366 are positive and control triggers 354 and 356 are set by the output signal transmitted by and-gate 366.

More particularly, the positive signal at the in-phase output of and-gate 366 is transmitted to or-gates 358 and 362 for setting the associated control triggers.

Simultaneously with the setting of control triggers 354 and 356, the in-phase output of minus-and-gate 336 initiates three operations.

First, a negative signal is fed to gates 294 and 296 to disable the same. Secondly, this negative signal is applied to minus-or-gate 348 to turn off or reset control trigger 340 and, finally, it is applied to minus-or-gate 300 and thus resets or turns off storage stage 286.

The off condition of storage stage 286 is detected by minus-and-gate 322, the output of which will become negative and will turn off control trigger 338 as soon as it is applied to minus-or-gate 344.

When control trigger 338 is in off condition, and-gate 306 is enabled since an input thereof is coupled to the out-of-phase output of or-gate 342. Thus, new data is allowed to propagate into storage stage 286 via or-gate 310. The validity of the data received by storage stage 286 is determined as has been indicated above.

Concurrently with the resetting of the storage stage 286 and with the propagation of new data into the same, the true and complementary circuits 290 and 292 have been flushing. When circuits 290 and 292 are flushed, the ouputs of the circuits are negative and the in-phase output of exclusive-or-gate 324 becomes negative so that the out-of-phase output of minus-and-gate 334 is positive. When the out-of-phase output of minus-and-gate 332 is also positive all of the inputs of and-gate 350 are positive, thus completing a transfer of data from storage stage 286 to storage stage 288.

The same interlocks that are employed for bi-polar gating are employed in the circuitry of FIG. 4 and are more particularly constituted by the flush and validity signals from each respective sequential stage.

There have been described above asynchronous controls for the propagation of data from one storage stage to another via logic circuits adapted for processing data in true and complement form. For purposes of efficient use of time, a provision has been made in the asynchronous controls to respond to the first change in output of the associated logic circuitry. It has thus been assumed that the logic circuitry is non-oscillatory.

Figure 5:
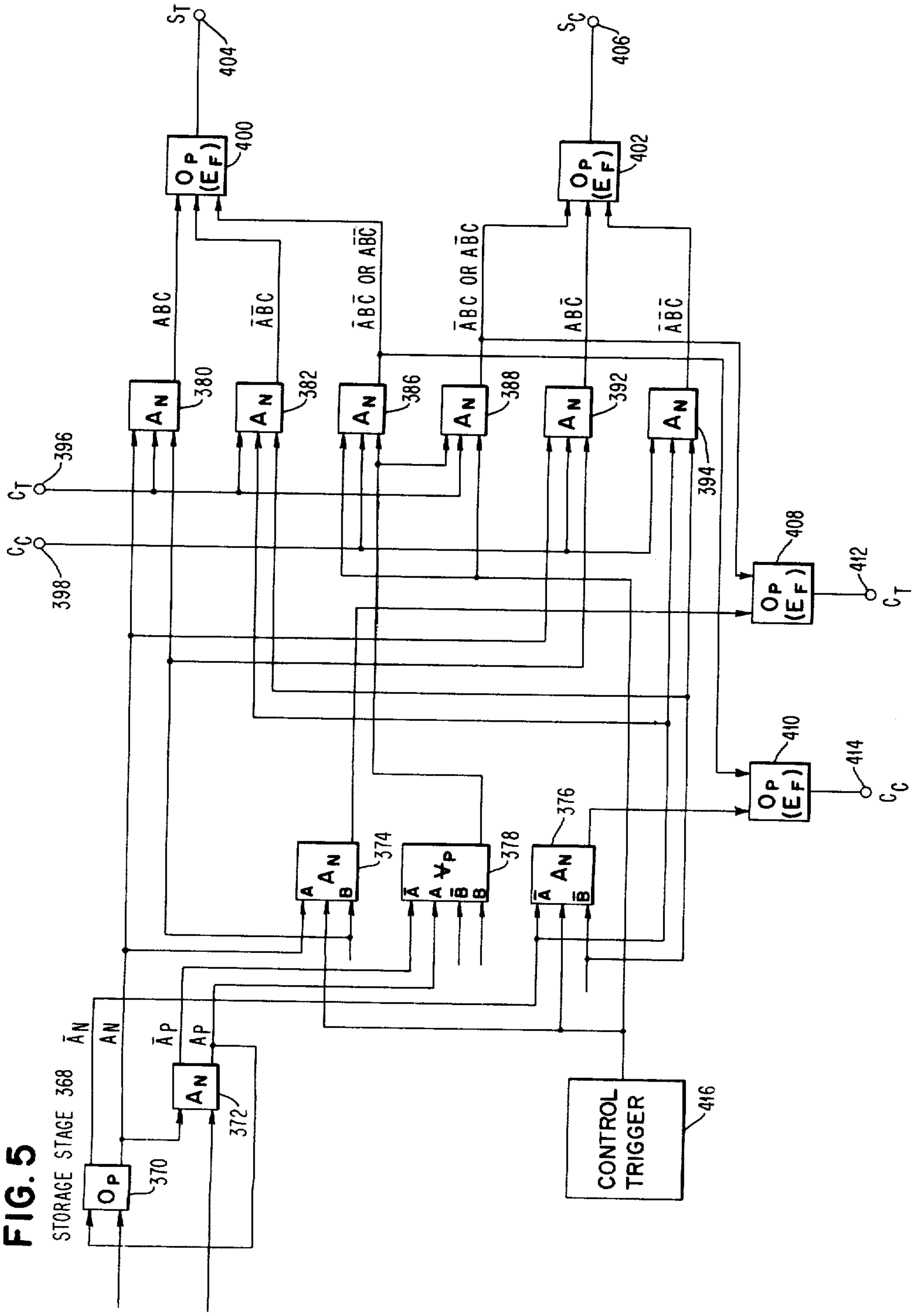
FIG. 5 is a logical diagram of a non-oscillatory adder adapted for being employed with the asynchronous controls of FIGS. 2–4.

A non-oscillatory logic circuit which is more sophisticated than the type included in the above-described circuits is shown in FIG. 5 in the form of a double-line non-oscillatory full adder with a serial carry. The illustrated adder is intended to process true and complement forms of the Nth bits of two binary numbers, each having a plurality of digits wherein the Nth bits are neither the first nor the last. To this end, the circuit is adapted both for receiving and transmitting carries. Further, the subject adder is adapted for receiving and transmitting these carries in true and complement form.

As will be shown hereinafter, the carries are employed to gate information out of the adder and this in turn is employed to render the adder non-oscillatory. In addition, the adder is also adapted for direct-coupled logic operation and is thus especially suitable for use with the asynchronous controls which have been heretofore described.

One of the bits to be added is provide in FIG. 5 by storage stage 268 which comprises an or-gate 370 and an and-gate 372. The source of the other of the two bits is any conventional source (not shown in FIG. 5, although a specific source will be described in detail hereinafter with reference to FIGS. 6–9).

And-gates 374 and 376 constitute the input gates of the logic circuit and control the entry of data into the same. Also arranged at the input to the adder is an exclusive-or-gate 378.

The bits sequentially provided by storage stage 368 will be arbitrarily designated the A bits. The other bits sequentially supplied to the adder circuit will be arbitrarily designated the B bits.

The A bits will be provided in the form of four signals: $\overline{A}n$, $An$, $\overline{A}p$ and $Ap$ (thus providing for N- and P-type transistor circuits).

$\overline{A}n$ is provided by the out-of-phase output of or-gate 370, whereas $An$ is provided by the in-phase output of or-gate 370. These signals are mutually exclusive and are signals which can be applied to the n-type blocks 374 and 376. When A is a one, $An$ is positive and $\overline{A}n$ is negative. When A is a zero, $An$ is negative and $\overline{A}n$ is positive.

$\overline{A}p$ is provided by the out-of-phase output of and-gate 372, whereas $Ap$ is provided by the in-phase output of this gate. These outputs are also mutually exclusive. When A is a one, $Ap$ is positive and $\overline{A}p$ is negative. When A is a zero, $\overline{A}p$ is positive and $Ap$ is negative.

Similarly, the B source provides the four B bit signals and it thus is possible to provide the signals required for and-gates 374 and 376 and exclusive-or-gate 378.

As to the specific application of the above signals, bits $An$ and $Bn$ are supplied to and-gate 374 and bits $\overline{A}n$ and $\overline{B}n$ are supplied to and-gate 376. Input signals $Ap$, $\overline{A}p$, $Bp$, and $\overline{B}p$ are applied to exclusive-or-gate 378.

Also included in the adder circuit are and-gates 380, 382, 386, 388, 392 and 394. These gates generate signals representing the true and complement sums.

Apart from the above input and output elements, terminals 396 and 398 respectively receive signals representing true carry and complement carries from a lower order stage. Terminal 396 is coupled to the inputs of gates 380, 382, and 388, whereas terminal 398 is coupled to the inputs of gates 386, 392 and 394. The other connections of these gates are next indicated below.

In addition to receiving a signal from terminal 396, gate 380 receives the same two inputs as does gate 374. Gate 380 therefore transmits a positive signal when bits A and B are ones or positive and there is a true carry.

Referring next to gate 382, this gate will transmit a positive signal when a positive signal is present at terminal 396 indicating the presence of a true carry and when the inputs to gate 376 are positive. Thus gate 382 transmits a positive signal in the presence of an $\overline{A}$ signal, $\overline{B}$ signal and true carry signal.

Gate 388 requires for the transmission of a positive signal the presence of a true carry signal in addition to a positive signal from the output of exclusive-or-gate 378 which indicates that the A and B bits are different or, in other words, mutually exclusive.

Gate 386 is provided with input signals applied to terminal 398 and those generated by exclusive-or-gate 378; gate 392 receives a signal from terminal 398 and further receives the signals representing A and B; and gate 394 is coupled to terminal 398 and receives signals representing $\overline{A}$ and $\overline{B}$.

The outputs of gates 380, 382 and 386 are coupled to an emitter-follower or-gate 400, the output of which constitutes the true sum signal. The outputs of gates 388, 392 and 394 are coupled to emitter-follower or-gate 402, the output of which constitutes the complement sum signal. The true and complement sum signals respectively appear at terminals 404 and 406 which are coupled to or-gates 400 and 402.

Also included in the adder circuit are emitter-follower or-gates 408 and 410. The inputs for or-gate 408 are provided by and-gate 388 and and-gate 374 and the output of this or-gate which appears at terminal 412 is the true carry signal.

The input signals for or-gate 410 are provided by the and-gate 386 and the and-gate 376 and the output of or-gate 410 which appears at terminal 414 is the complement carry signal. Carry signals transmitted to terminals 412 and 414 are transmitted to the next higher order stage.

The signals appearing at terminals 404 and 406 are employed in connection with a sequential storage stage as will be further indicated hereinafter.

Also included in the circuit of FIG. 5 is a control trigger 416 coupled to gates 374 and 376 to control the enabling and disabling of the same and therefore the actuation and flushing of the adder. Trigger 416 is also connected to gates 388 and 386 which, it will be noted, are coupled to or-gates 408 and 410.

The adder which has been described above has various unique advantages.

Although a true and complementary sum and a true and complementary carry are generated and are independent of one another in operation, the adder does not consist of independent true and complement adders. Nevertheless, a careful analysis of the logic will reveal that although one circuit is described for both true and complement functions, no single error can cause an error in both the true and complement outputs of the adder. Therefore, the error can always be detected.

Moreover, the adder is non-oscillatory since the first change in the outputs for both flushing the data and adding the data is the final change with respect thereto. This property is essential for the asynchronous control techniques which have heretofore been described with reference to FIGS. 1–4. This property also guarantees that an add operation is completed when all of the outputs become mutually exclusive.

For a further understanding of the operation of the adder, let it be assumed that control trigger 416 is off and that gates 374 and 376, as well as gates 388 and 386, are therefore disabled. This will provide that negative signals exist at terminals 412 and 414 and therefore the carry terminals exhibit a flushed condition.

If at the same time the same condition exists in the next lower order, negative signals will appear at terminals 396 and 398 because the next lower order will also exhibit a flushed condition.

Negative signals at terminals 396 and 398, when control trigger 416 is off, result in the disabling of all of the gates 380–394. This, in turn, result in negative signals at terminals 404 and 406, so that the adder appears to have been flushed and is thus prepared for receiving new data.

In the event that the above conditions obtain, and assuming that appropriate conditions exists in the subsequent storage stage (not shown) appropriate signals will be forwarded by the asynchronous controls, which has been described above, to control trigger 416 to turn the same on.

A and B bits are assumed available for processing by the adder. The turning on of control trigger 416 will initiate an adding operation which, however, cannot be completed until a flushed condition ceases to exist at terminals 396 and 398. Stated otherwise, the signals at terminals 396 and 398 must be mutually exclusive in addition to there being data available for processing by the adder in order for the adder to transmit a valid output.

When the above indicated conditions exist, output terminals 404 and 406 will become mutually exclusive and thus valid data will be available for transmission into the subsequent storage stage. At the same time, mutually exclusive conditions will exist at terminals 412 and 414 and a carry (in the form of a one or zero) will be transmitted to the next higher order in the adding circuitry.

In the general sequence of events, bits will be supplied to all orders of the adding circuits of which the illustrated circuit is one. These bits will be available prior to the carries inasmuch as it is the processing of the bits which results in the carries. Thus, for the output of the adder to be non-oscillatory, the arrival of the carries should provide for the first change in output signal.

Actually, this is the way the adder circuit operates and the above-noted circuitry will be re-examined for purposes of determining that this is so.

At the outset, terminals 404 and 406 are negative and thus indicate a flushed condition in the adder. Assuming that control trigger 416 is turned on and valid bits A and B are available for processing in the adder circuit, the gates 380–394 nevertheless remain disabled as long as a flushed condition is detected at terminals 396 and 398. This results from the fact that a flushed condition means that the signals at terminals 396 and 398 are negative which, in turn, will cause each of gates 380–394 to be disabled. Accordingly, negative signals will continue to exist at terminals 404 and 406 despite the fact that control trigger 416 has been turned on and further, despite the fact that A and B bits are available for processing.

When, however, the next lower order stage transmits a carry (in the form of a one or zero) to terminals 396 and 398, these terminals must necessary receive mutually exclusive types of signals, assuming that no error has occurred. Thus, when a carry is received, one of the terminals 396 or 398 becomes positive whereupon four of the associated gates 380–394 become enabled so that data can be exhibited at terminals 404 and 406.

In addition to being non-oscillatory, the above adder circuit incorporates features for saving time. To this end, it is to be noted that carry signals supplied to terminals 412 and 414 are not necessarily delayed until carry signals appear at terminals 396 and 398. For example, if the A and B bits are both ones, a carry indication should sooner or later result at terminals 412 and 414 and this desired result will not be changed by the presence or absence of a carry at terminals 396 and 398. To avoid delay, terminal 412 can receive a positive signal via or-gate 408 from and-gate 374 immediately upon an actuation of control trigger 416, while terminal 414 can receive a positive signal via or-gate 410 from the and-gate 376 immediately when the control trigger 416 has been set.

Thus, with control trigger 416 set, and the other inputs to gates 374 and 376 positive, a carry condition is indicated and a positive signal will immediately appear at one of the terminals 412 and 414 independently of the potentials at terminals 396 and 398.

With the above features of the adder circuit having been explained, it is next possible to examine the specific adding provisions which have been made.

Six gates perform different adders functions. These functions correspond to the six possible conditions which can exist in binary addition and the reaction of the adder circuit to these conditions will next be indicated in detail below.

Let it be assumed as a first example that the A and B bits are ones and that there is a carry of one from the next lower order circuit. The A and B signals and the true carry signal will be positive, and the $\overline{A}$ and $\overline{B}$ and complement carry signals will be negative.

The negative signal at terminal 398, which is due to the complement carry signal's being negative, disables gates 386, 390, 392 and 394 and the negative signals transmitted to and-gate 376 cause a negative signal to be transmitted to or-gate 410. Gate 386 which is disabled, also transmits a negative signal to or-gate 410 so that the signal appearing at terminal 414 is negative.

At the same time, the signals supplied to and-gate 374 are both positive and a positive signal is transmitted via or-gate 408 to terminal 412 so that terminals 412 and 414 immediately become mutually exclusive and a valid carry is transmitted to the next higher order stage.

The positive A and B signals are also transmitted directly to and-gate 380. Thus, upon the arrival of the positive signal at terminal 396, and-gate 380 transmits a positive signal via or-gate 400 to terminal 404 which becomes positive.

As to terminal 406, the and-gates 392 and 394 coupled thereto are disabled by the negative signal at terminal 398. There is only one other gate coupled to terminal 406 and this is gate 388 which receives a positive signal from terminal 396 but which receives a negative signal from exclusive-or-gate 378 since the A and B signals are not mutually exclusive.

Accordingly, the signal at terminal 406 remains negative and terminals 404 and 406 become mutually exclusive and transmit a valid data signal to the subsequent storage stage.

A condition has thus been established whereby valid data is propagated from the adder circuit via its sum output and carry output terminals. The sequence of operations described previously with respect to the asynchronous controls then permits the next sequential adding operation as soon as it has been determined that no errors have occurred.

Gate 382 accounts for a second adding function and provides an output when the A and B bits are zero and when there is a true carry. This corresponds to the addition of two zeros and a one and is represented by the signals $\overline{A}$ and $\overline{B}$ and carry true. For this addition, two of the inputs to and-gate 382 are the $\overline{A}$ and $\overline{B}$ signals, the third signal being provided from terminal 396 which is positive so that and-gate 382 transmits a positive signal via or-gate 400 to terminal 404.

At the same time, the remainder of gates 380–394 are disabled so that a negative signal appears at terminal 406 and it can be similarly determined that a negative signal appears at terminal 412. On the other hand, and-gate 376 which receives two positive signals in the form of $\overline{A}$ and $\overline{B}$ transmits a positive signal via gate 410 to terminal 414 to indicate a complement carry. Thus, terminals 412 and 414 become mutually exclusive and indicate that the carry is validly zero, this being the desired result for the addition of two zeros and a one.

Accounting for still another function, gate 388 responds to the condition in which one of the A or B bits is a one and the other is a zero and there is, additionally, a true carry. Gate 388 receives an input signal from the exclusive-or-gate 378 when the A and B bits are mutually exclusive, which signal will enable said gate. With the gate 388 thus enabled, a positive signal at terminal 396 will cause the and-gate 388 to issue a positive signal which is transmitted via the or-gate 408 to terminal 412 to indicate a true carry. At the same time it can be demonstrated that the signal appearing at terminal 414 remains negative so that a valid carry is propagated.

As to the true sum, the signal at terminal 404 remains negative, the gates 380, 382 and 386 being disabled as can readily be determined.

In addition to the above, this particular addition requires that a positive signal be transmitted to terminal 406 so that terminals 404 and 406 become mutually exclusive to indicate the presence of valid data. The positive signal is transmitted to terminal 406 via gate 388 which receives a positive signal from exclusive-or-gate 378 and a positive signal from terminal 396.

In the manner indicated above, it can be determined that and-gate 386 provides a proper addition when the A and B bits are mutually exclusive and when there is no carry and that and-gate 392 provides for proper addition when the A and B bits are ones, but there is no true carry. And-gate 394 provides for the situation in which the A, B and carry bits are all zeros.

Figure 6:
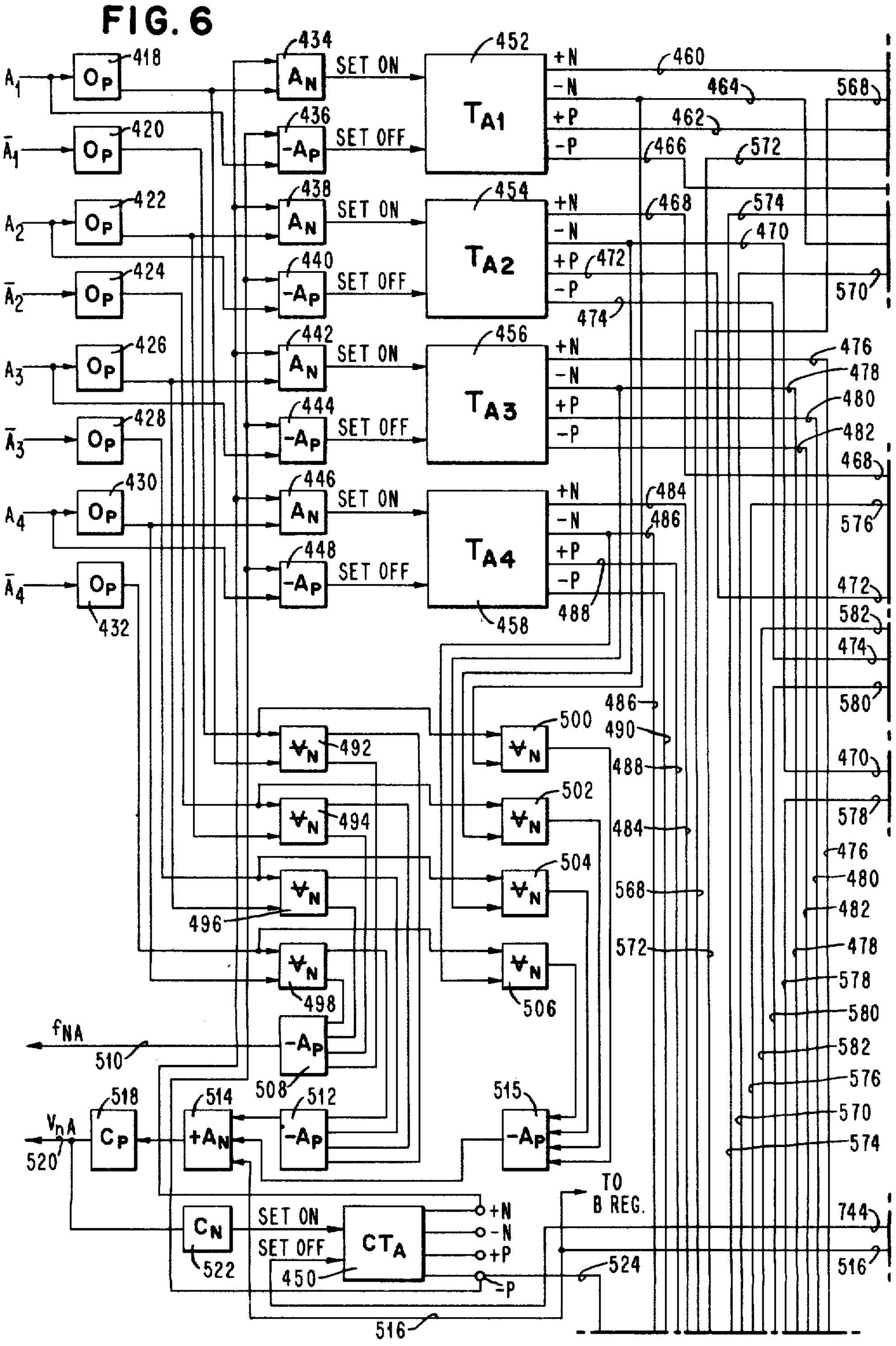
Figure 7:
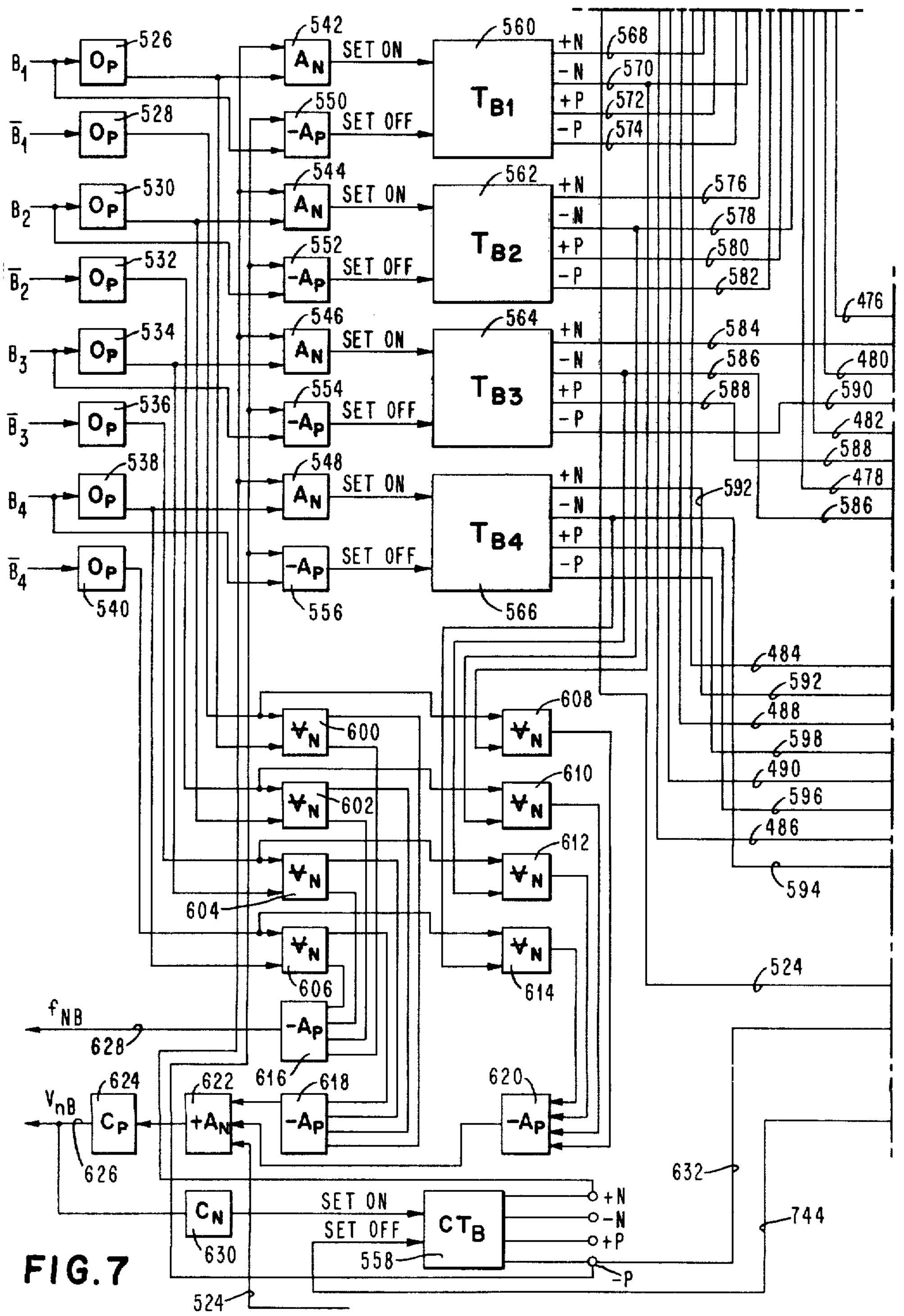
Figure 8:
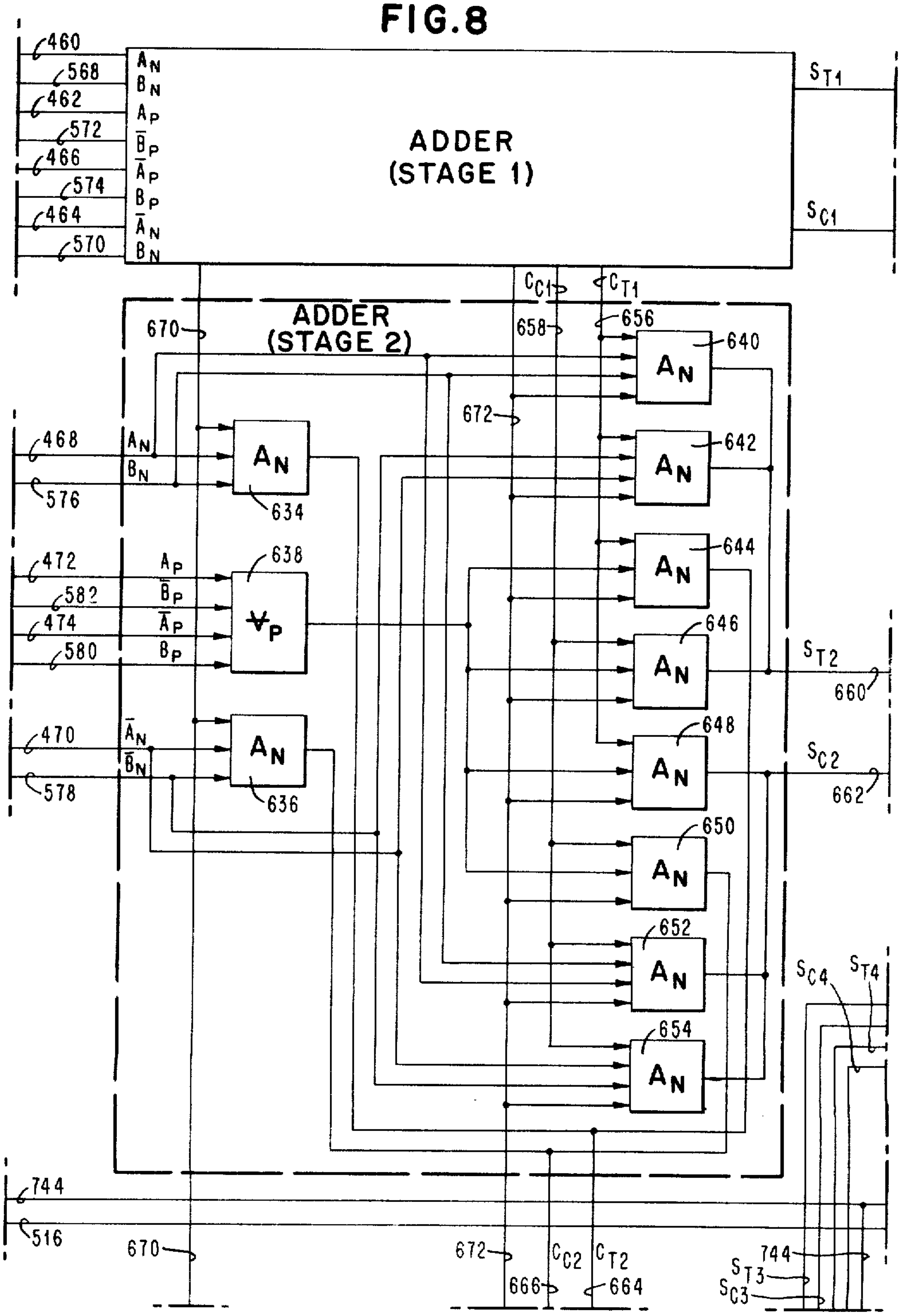
Figure 9:
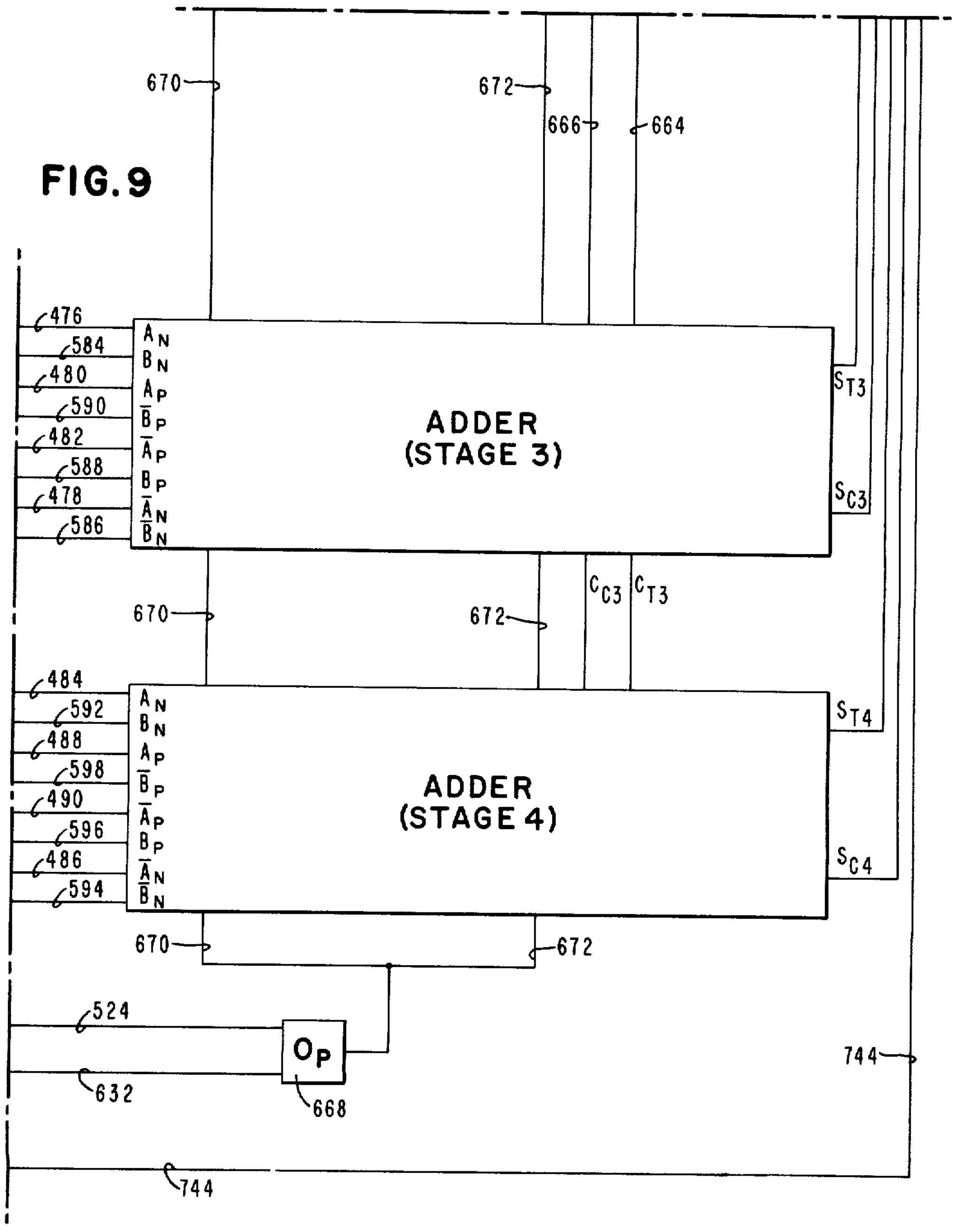
Figure 10:
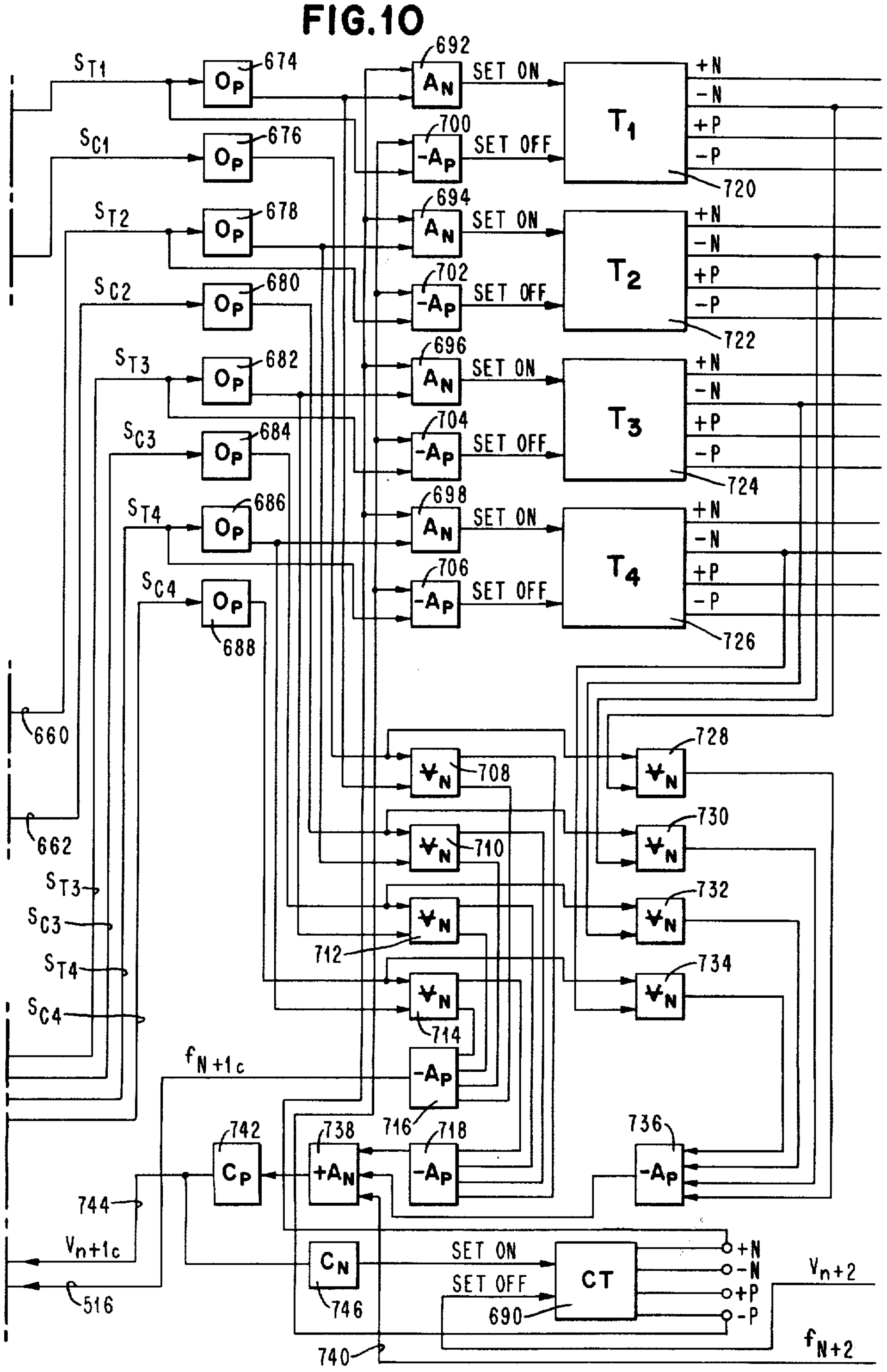

The circuit of FIGS. 6–10 constitutes a four bit adder. FIG. 6 represents the input section of the adder and serves to introduce the digits of one of two numbers to be added; FIG. 7 represents the input section for the digits of the other of the two members to be added; FIGS. 8 and 9 represent the adding section; and FIG. 10 illustrates the output section.

The digits or bits of one of the two numbers to be added will be designated $A_1$, $A_2$, $A_3$ and $A_4$ or $\overline{A}_1$, $\overline{A}_2$, $\overline{A}_3$ and $\overline{A}_4$, the numerical subscript representing the order of significance of the digit. $A_n$ will be a one and $\overline{A}_n$ will be a zero.

Similarly, the four digits or bits of the second number will be indicated as $B_1$, $B_2$, $B_3$ and $B_4$ or $\overline{B}_1$, $\overline{B}_2$, $\overline{B}_3$ and $\overline{B}_4$, $B_n$ being a one and $\overline{B}_n$ being a zero.

The circuit of FIG. 6 comprises eight or-gates 418, 420, 422, 424, 426, 428, 430 and 432. The $A_1$ signal is transmitted to or-gate 418, whereas the $\overline{A}_1$ signal is transmitted to or-gate 420; the $A_2$ signal is fed to or-gate 422, whereas the $\overline{A}_2$ signal is fed to or-gate 424; the $A_3$ signal is fed to or-gate 426, whereas the $\overline{A}_3$ signal is fed to or-gate 428; the $A_4$ signal is fed to or-gate 430, whereas the $\overline{A}_4$ signal is transmitted to or-gate 432.

Additionally, the circuit of FIG. 6 comprises and-gate 434; minus-and-gate 436; and-gate 438; minus-and-gate 440; and-gate 442; minus-and-gate 444; and-gate 446; and minus-and-gate 448. A control trigger 450 provides an input for each of gates 434–448.

Gates 434 and 436 receive the $A_1$ signal which is positive when $A_1$ is a one and negative when $A_1$ is a zero. Gates 438 and 440 receive the $A_2$ signal; gates 442 and 444 receive the $A_3$ signal; and gates 446 and 448 receive the $A_4$ signal.

Triggers 452–458 are provided for storing the $A_1$–$A_4$ signals respectively. For example, when control trigger 450 is on, and the $A_1$ signal is positive indicating that $A_1$ is a one, trigger 452 is set. When control trigger 450 is off and $A_1$ is negative, trigger 452 is turned off.

When trigger 452 is on, positive signals are transmitted via lines 460 and 462 and negative signals are transmitted via lines 464 and 466. When trigger 452 is turned off, positive signals are transmitted via lines 464 and 466 and negative signals are transmitted via lines 460 and 462. This reflects whether $A_1$ is a one or a zero.

Trigger 454 has four output lines 468, 470, 472 and 474. When trigger 454 is on, positive signals are transmitted via lines 468 and 472 and negative signals are transmitted via lines 470 and 474. When trigger 454 is off, positive signals are transmitted via lines 470 and 474 and negative signals are transmitted via lines 468 and 472.

Trigger 456 is provided with four output lines 476, 478, 480 and 482. When trigger 456 is on, positive signals are transmitted via lines 476 and 480 and negative signals are transmitted via lines 478 and 482. When trigger 456 is off, positive signals are transmitted via lines 478 and 482 and negative signals are transmitted via lines 476 and 480.

Trigger 458 is provided with four output lines 484, 486, 488 and 490. When trigger 458 is on, positive signals are transmitted via lines 484 and 488 and negative signals are transmitted via lines 486 and 490. When trigger 458 is off, positive signals are transmitted via lines 486 and 490 and negative signals are transmitted via lines 484 and 488.

In addition to the above, the circuit of FIG. 6 includes exclusive-or-gates 492–506.

Exclusive-or-gate 492 receives its input signals from or-gates 418 and 420; exclusive-or-gate 494 receives its input signals from or-gates 422 and 424; exclusive-or-gate 496 receives its input signals from or-gates 426 and 428; exclusive-or-gate 498 receives its input signals from or-gates 430 and 432.

Exclusive-or-gate 500 receives its input signals from line 464 of trigger 452 and from or-gate 420; exclusive-or-gate 502 receives its input signals from line 470 of trigger 456 and from or-gate 428; and exclusive-or-gate 506 receives its input signals from line 486 of trigger 458 and from or-gate 32.

The in-phase outputs of exclusive-or gates 492–498 are anded together by a minus-and-gate 508. And-gate 508 constitutes a flush generator which transmits a flush signal via line 510 to a preceding stage (not shown).

The out-of-phase outputs of exclusive-or-gates 492–498 are anded together by a minus-and-gate 512 which transmits its out-of-phase output signal to an and-gate 514.

The out-of-phase outputs of exclusive-or-gates 500–506 are anded together by a minus-and-gate 515; the out-of-phase output of which constitutes an input to and-gate 514. Another input to and-gate 514 is provided by line 516 which carries the validity signal from a subsequent stage (not shown).

The out-of-phase output of and-gate 514 constitutes an input to convert block 518, the output of which is transmitted as a validity signal via line 520.

Line 520 is connected to convert block 522 which, in turn, is coupled to control trigger 450.

For purposes of understanding the operation of the circuit in FIG. 9, it should be noted that control trigger 450 transmits a negative signal via line 524 when on and a positive signal via line 524 when off.

FIG. 7 is constituted by essentially the same circuit as has been noted above with respect to FIG. 6.

This circuit includes eight or-gates 526, 528, 530, 532, 534, 536, 538 and 540.

Or-gate 526 receives the $B_1$ signal, whereas or-gate 528 receives the $\overline{B}_1$ signal; or-gate 530 receives the $B_2$ signal, whereas or-gate 532 receives the $\overline{B}_2$ signal; or-gate 534 receives the $B_3$ signal, whereas or-gate 536 receives the $\overline{B}_3$ signal; and or-gate 538 receives the $B_4$ signal, whereas or-gate 540 receives the $\overline{B}_4$ signal.

Also included in the circuit of FIG. 7 are and-gates 542, 544, 546 and 548 and minus-and-gates 550, 552, 554 and 556.

And-gate 542 receives the $B_1$ signal and a signal from the in-phase output of a control trigger 558; minus-and-gate 550 similarly receives the $B_1$ signal but receives a signal from the out-of-phase output of control trigger 558. Gates 544 and 552 are similarly connected as are pairs of gates 546 and 554 and 548 and 556 respectively.

The circuit also comprises triggers 560–566. Trigger 560 is provided with output lines 568, 570, 572, 574 which bear the notations +N, −N, +P and −P. These notations are the same as those for the triggers 452–458 in FIG. 6 and indicate the same functions for trigger 560.

Trigger 562 is provided with four output lines 576–582, which also bear the notations +N, −N, +P and −P respectively. Trigger 564 includes output lines 584, 586, 588 and 590 and trigger 566 is provided with output lines 592, 594, 596 and 598.

The circuit further comprises exclusive-or-gates 600, 602, 604, 606, 608, 610, 612 and 614. The exclusive-or-gates are connected in a manner similar to that indicated for the equivalent exclusive-or-gates in FIG. 6.

The in-phase outputs of exclusive-or-gates 600–606 are anded together in a minus-and-gate 616 and the out-of-phase outputs of exclusive-or-gates 600–606 are anded together in a minus-and-gate 618.

The out-of-phase outputs of exclusive-or-gates 608–614 are anded together in a minus-and-gate 620.

The out-of-phase outputs of minus-and-gates 618 and 620 are anded together by an and-gate 622, the other input to which is the validity signal transmitted via line 524 (see also FIG. 6).

The out-of-phase output of and-gate 622 is transmitted via convert block 624 to line 626 which line thus carries a validity signal. Line 628 connects to the out-of-phase output of minus-and-gate 616 and carries a flush signal.

Line 626 is also connected via convert block 630 to control trigger 558 having its out-of-phase output coupled to line 632.

Reference is next made to the adder circuitry of FIGS. 8 and 9 wherein it will be noted that four adder stages are provided for the four pairs of digits which are to be added. Provision is made for adding $A_1$ to $B_1$, $A_2$ to $B_2$, $A_3$ to $B_3$ and $A_4$ to $B_4$ (or, in other words, $\overline{A}n$ to $\overline{B}n$.

Since adder stages 1–4 are essentially alike in detail, with the exception of the carry input of the stage 1 and the carry output of stage 4, only adder stage 2 has been shown in detail. However, the inputs to the different stages will next be indicated for purposes of tying in the signals transmitted by triggers 452–458 and 560–566 of FIGS. 6 and 7, respectively.

The input signals for adder stage 1 are received via lines 460–466 and 568–574; the input signals for adder stage 2 are received via lines 468–474 and 576–582; the input signals for adder stage 3 are received via lines 476–482 and lines 584–590; and the input signals for adder stage 4 are received via lines 484–490 and 592–598.

In the different adder stages, the input lines are given the different notations $A_N$, $B_N$, $A_P$, $\overline{B}_P$, $\overline{A}_P$, $B_P$, $\overline{A}_N$, and $B_N$. The N and P notations refer simply to the type of transistor circuit involved, whereas the notations A and B identify the digits as heretofore explained. How these digits are processed has already been explained with reference to FIG. 5, but the components of a typical stage will next be identified below.

Thus, for example, adder stage 2 includes and-gates 634 and 636 and exclusive-or-gate 638.

And-gate 634 receives the A and B signals, whereas and-gate 636 receives the $\overline{A}$ and $\overline{B}$ signals. The exclusive-or-gate 638 receives the A and $\overline{B}$ signals, as well as the $\overline{A}$ and B signals to determine the mutual exclusivity thereof.

Adder stage 2 further comprises and-gates 640–654, these gates being coupled (in a manner similar to that of FIG. 5) to true carry line 656 and complement carry line 658.

For the sake of simplicity, the buffering of the outputs, both sum and carry, have not been shown in detail, the true sum signal ($ST_n$) appearing on line 660 and the complement sum signal ($SC_n$) appearing on line 662. The true carry output signal ($CT_n$) appears on line 664 and the complement carry signal ($CC_n$) appears on line 666.

Also included in the circuit of FIG. 8 is or-gate 668 which buffers together the signals appearing on lines 524 and 632 which respectively originate at control trigger 450 in FIG. 6 and control trigger 558 in FIG. 7, respectively.

Or-gate 668 passes a signal which enables and disables gates 634 and 636 and gates 640–654 by means of signals transmitted via lines 670 and 672.

In FIG. 10, signal $ST_1$ is applied to or-gate 674 and signal $SC_1$ is applied to or-gate 676; signal $ST_2$ is applied to or-gate 678 and signal $SC_2$ is applied to or-gate 680 (via lines 660 and 662 respectively); signals $ST_3$ and $SC_3$ are applied to or-gates 682 and 684 respectively; and signals $ST_4$ and $SC_4$ are applied to or-gates 686 and 688 respectively.

The circuit of FIG. 10 includes a control trigger 690, an in-phase output of which controls the enabling and disabling of and-gates 692, 694, 696 and 698. An out-of-phase output of control trigger 690 controls the enabling and disabling of minus-and-gates 700, 702, 704 and 706.

Gates 692 and 700 also receive the $ST_1$ signal; gates 694 and 702 receive the $ST_2$ signal; gates 696 and 704 receive the $ST_3$ signal; and gates 698 and 704 receive the $ST_4$ signal.

Exclusive-or-gates 708–714 test for the mutual exclusivity of the respective $ST_n$ and $SC_n$ signals. The in-phase outputs of exclusive-or-gates 708–714 are anded together by minus-and-gate 716, whereas the out-of-phase outputs of these exclusive-or-gates are anded together by minus-and-gate 718. The out-of-phase output of minus-and-gate 716 is connected to line 516 whereon is transmitted the flush signal for storage stage $N+1$ constituted by triggers 720, 722, 724 and 726. Each of triggers 720–726 is provided with four output lines designated +N, −N, +P and −P, according to the notation heretofore explained.

Further included in the circuit of FIG. 10 are exclusive-or-gates 728, 730, 732, and 734. Exclusive-or-gates 728–734 test for the mutual exclusivity of the respective $SC_n$ signals and the out-of-phase signals generated by triggers 720–726. The out-of-phase outputs of exclusive-or-gates 728–734 are anded together in a minus-and-gate 736, the out-of-phase output of which is anded together with the out-of-phase output of minus-and-gate 718 by an and-gate 738. A further input to and-gate 738 is received via a line 740 which carries the flush signal from the next sequential stage.

The out-of-phase output of and-gate 738 is transmitted via a convert block 742 to a line 744 whereon is transmitted the validity signal. Line 744 appears also in FIGS. 6 and 7 and is the means whereby a resetting of control triggers 450 and 558 is implemented.

From the detailed explanation given hereinabove as to the operation of the asynchronous controls and non-oscillatory adder, the operation of the circuits of FIGS. 6–10 will be apparent. Control triggers 450 (FIG. 6) and 558 (FIG. 7) control the gating of information into storage triggers 452–458 (FIG. 6) and storage triggers 560–566 (FIG. 7) and from these triggers into adder stages 1–4 when the adder stages are flushed and thus adapted to receive data. Control trigger 690 controls the admission of the sum data into storage triggers 720–726.

The validity generator constituted by minus-and-gate 716 and and-gate 738 senses the flushing of the adder circuitry and the validity of the data received by storage triggers 720–726 to permit the propagation of further data into the adder circuitry.

The interlocks noted heretofore are present in the form of lines 510, 516, 520, 744 and 740 and so forth, so that the operations of the various stages are coordinated. The flush and validity generators sense immediately changes in the output signals of the adder circuits which are non-oscillatory and therefore especially adapted for use with the asynchronous controls provided.

The system which has been indicated above permits each of a sequence of adding operations to be initiated as soon as the preceding operation is validly complete. It therefore permits the processing of data at an optimum rate.

Provision is also made in the system for the processing of data in its true and complement form although separate and distinct logic circuits are not provided for these forms.

Moreover, the true and complement forms are employed for error checking purposes since the mutual exclusivity of the true and complement signals is an indication of the validity of the data handled.

This error checking technique has been combined in the above-noted system with asynchronous control techniques to provide high speed data processing operations in which the possibility of error is substantially completely avoided.

The time required for data transmission by the above-noted system is as short as is permitted by the time delays inherent in the components employed.

There will now be obvious to those skilled in the art many modifications and variations of the circuits and techniques discussed above. These modifications and variations will not, however, depart from the scope of the invention if defined by the following claims.

What is claimed is:

1. A data processor comprising logic means adapted for processing electronic signals representing data and for propagating output signals representing processed data, said logic means being non-oscillatory and thereby exhibiting useful information upon each change of said output signals, input means for the supply of said electronic signals, gate means coupling said input means to said logic means for the transmission of said electronic signals thereto, said gate means being adapted to isolate the logic means from the input means whereupon said logic means assumes a flushed state in which data is absent therefrom, output means coupled to said logic means and adapted to receive output signals therefrom, and control means coupled to said gate and output means and to said logic means and responsive to the first change of signals transmitted from said logic means to said output means following a flushed state in said logic means for controlling the gating of signals from said input means to said logic means.

2. Apparatus comprising logic means for processing direct-coupled signals representing data, said logic means being adapted to for manipulating said direct-coupled signals and propagating processed output signals, said logic means being further adapted to assume a flushed state in which state there is an absence of data in the logic means, input means coupled to said logic means and adapted to transmit said direct-coupled signals thereto for processing, storage means coupled to said logic means and adapted to receive processed signals therefrom, and control means coupled to said input, storage, and logic means and responsive to each flushed state and upon each flushed state to the first valid signals received from said logic means by said storage means for controlling the transmission of signals from said input means to said logic means.

3. A data processor comprising logic means adapted for processing electronic signals representing data in true and complement form, said logic means being non-oscillatory and thereby generating useful output signals with each change of the latter, input means coupled to said logic means and adapted to transmit said electronic signals thereto, output means coupled to said logic means and adapted to receive processed signals therefrom, and control means coupled to said input, output and logic means and responsive to the useful output signals transmitted from said logic means to said output means for controlling the release of signals from said input means to said logic means, said control means further inspecting the validity of data received by said output means by checking the true against the complement form thereof.

4. An asynchronous data transfer system comprising a plurality of storage stages, a plurality of logic circuits each interconnecting successive storage stages, a plurality of signalling means associated with said plurality of storage stages and logic circuits each providing a signal indicating that a data transfer between a preceding storage stage and an associated storage stage is validly completed and a plurality of control means associated with said plurality of storage stages each responsive to a completion signal for controlling the entry of new data to said preceding storage stage for transfer to said associated storage stage.

5. A data transfer system comprising a data source, means to receive data sequentially from said source, and asynchronous means coupled to the first said means and to said source and adapted to determine validity of data transferred to the first said means and in accordance therewith to enable said source selectively to transfer further data.

6. A data transfer system comprising a data source, means to receive data sequentially from said source, nonoscillatory logic means coupling said source to the first said means, and asynchronous means coupled to the first said means and to said source and adapted to determine validity of data transferred to the first said means and in accordance therewith to enable said source selectively to transfer further data, said data source and first said means propagating said data in a true and complement form thereof, said asynchronous means comparing the true and complement form to determine validity of the data.

7. A data transfer system comprising a data source, means to receive data sequentially from said source, and asynchronous means coupled to the first said means and to said source and adapted to determine validity of data transferred sequentially to the first said means and in accordance therewith to enable said source selectively to transfer further data, said asynchronous means having at least two conditions which are established according to the validity of the data transferred and being adapted normally to detect both of said conditions during a data transfer, a failure of the asynchronous means to detect both conditions indicating a malfunctionnig of said system and terminating the transfer of data.

8. A data transfer system comprising a plurality of storage stages, a plurality of logic circuits each interconnecting successive storage stages, a plurality of control means associated with said plurality of storage stages each controlling the transfer of data to and from said associated storage stage, a plurality of first means each coupled to a corresponding one of said plurality of logic circuits to provide a first signal indicating that the corresponding logic circuit has been flushed and a second signal indicating that new data has been propagated via the corresponding logic circuit from a preceding storage stage and is validly stored in said corresponding storage stage, a plurality of second means each responsive to the combination of the first signal from said first means associated with the succeeding storage stage and the second signal from said first means associated with said corresponding storage stage to provide a third signal indicating that the logic circuit connected between said corresponding storage stage and said succeeding stage has been flushed and that new data propagated via the logic circuit connected between said preceding storage stage and said corresponding storage stage is validly stored in said corresponding storage stage, and means for applying said third signal to render said control means associated with said corresponding storage stage effective to block further data transfer to said corresponding storage stage and to permit data transfer from said corresponding storage stage via said interconnecting logic circuit to said succeeding storage stage and to render said control means associated with said preceding storage stage effective to permit further data transfer to said preceding storage stage and to flush the logic circuit connected between said preceding storage stage and said corresponding storage stage.

9. A data transfer system comprising first and second storage means, input and output gates coupled to each of said storage means for controlling the entry to and withdrawal of data from said storage means, logic means coupled between the output gate of the first storage means and the input gate of the second storage means to process data transferred betwen the storage means, and control means responsive to the flushing of data from said logic means and to the validity of data received by said second storage means for enabling and disabling said gates.

10. A data transfer system comprising first and second storage means, gates coupled to each of said storage means for controlling the entry to and withdrawal of data from said storage means, logic means coupled by said gates to the first and second storage means to process data transferred between the storage means, said logic means having an active condition in which data is present and a flushed condition in which data is absent, and control means responsive to a flushed condition in said logic means for enabling and disabling said gates, said logic means processing said data in true and complement form, said control means detecting the absence of both said forms to determine the existence of a flushed condition in said logic means.

11. A data transfer system comprising first and second storage means, gates coupled to each of said storage means for controlling the transfer of data between said storage means, means coupled between the storage means via said gates and adapted to carry data being transferred between the storage means, and control means responsive to the validity of the transfer of data between said storage means for enabling and disabling said gates.

12. A data system comprising a data source adapted to propagate one of two electrical signals to represent said data and to propagate the other of said signals as the complement of said data, first gate means coupled to said source and adapted to control the transmission of said signals therefrom, logic means coupled to said gate means and adapted to propagate signals representing the data in true and complement form, first exclusive-or-means coupled to said logic means and adapted on the presence of true and complement signals in the logic means to generate a first predetermined signal and on the absence of said true and complement signals in the logic means to generate a second predetermined signal, storage means, second gate means coupling said storage means to said logic means for transferring the true signals therebetween, second exclusive-or-means coupled to said logic and storage means and sensitive to the complement signal in the logic means and the true signal in said storage means to generate a signal indicating valid data in said storage means, and control means responsive to the signals of said exclusive-or-means for enabling and disabling said first gate means.

13. A data system comprising a means to propagate electrical signals to represent said data in true and complement form, gate means coupled to the first said means and adapted to control the transmission of said signals therefrom, logic means coupled to said gate means and adapted to process said signals in true and complement form, first detecting means coupled to said logic means and adapted in the absence of true and complement signals in the logic means to generate a predetermined signal, storage means coupled to said logic means for receiving the true signal therefrom, second detecting means coupled to said logic and storage means and sensitive to the complement signal in the logic means and the true signal in said storage means to generate a signal indicating valid data in said storage means, and control means responsive to the signals of said detecting means for enabling and disabling said gate means.

14. Apparatus comprising first data storage means adapted to supply electrical signals to represent data in true and complement form, first gate means coupled to said storage means and adapted to control the transmission of said signals therefrom, logic means coupled to said gate means and adapted to process signals representing the data in true and complement form, first detection means coupled to said logic means and adapted in the absence of true and complement signals in the logic means to generate a predetermined signal, second storage means coupled to said logic means for receiving the true signal therefrom, said detection means being coupled to said logic and second storage means and sensitive to the complement signal in the logic means and the true signal in said second storage means to generate a signal indicating valid data in said second storage means, and trigger means responsive to the signals of said detection means for enabling and disabling said gate means, and second gate means coupled to said trigger means and to said first storage means, said second gate means being responsive to said trigger means for admitting data into said first storage means.

15. Apparatus comprising data storage means, input and output means coupled to each of said storage means, logic means coupling the output means to said input means so that the storage means are connected in series, trigger means for each of said storage means and connected to the input and output means thereof, said trigger means each having conditions in which the associated input means are enabled and the associated output means are disabled and in which the associated input and output means are respectively disabled and enabled, detecting means for each of said storage means, each said detecting means being coupled to and detecting the absence of data in the logic means connected to the input means of the associated storage means, each said detecting means being further coupled to the associated storage means to indicate the validity of data therein, each said trigger means being coupled to and responsive to the associated detecting means for enabling and disabling the associated input and output means, said detecting means being coupled together to coordinate the operation of said trigger means.

16. Apparatus comprising a plurality of data storage means, input and output gates coupled to each of said storage means, logic means selectively coupling the output gates to said input gates so that the storage means are connected in series, said storage and logic means constituting a double line system in which data is represented in true and complement form, control means for each of said storage means and connected to the input and output gates thereof, said control means each having a first condition in which the associated input gates are enabled and the associated output gates are disabled and a second condition in which the associated input and output gates are respectively disabled and enabled, flush and validity detecting means for each storage means, each said detecting means being coupled to and detecting the absence of both said forms of data in the logic means connected to the input gate of the associated storage means, each said detecting means being further coupled to the associated storage means to compare the true form of the data therein with the complement form of the data in the associated logic means, each said control means being coupled to and responsive to the associated detecting means for enabling and disabling the associated gates, said detecting means being coupled together to coordinate the operation of said control means.

17. Apparatus containing a plurality of data storage means, input and output gates coupled to each of said storage means, logic means selectively coupling the output gates to said input gates so that the storage means are connected in series, control means for each of said storage means and connected to the input and output gates thereof, said control means each having a first condition in which the associated input gates are enabled and the associated output gates are disabled and a second condition in which the associated input and output gates are respectively disabled and enabled, flush and validity detecting means for each storage means, said detecting means being coupled to and detecting the absence of data in the logic means connected to the input gates of the associated storage means, each said detecting means being further coupled to the associated logic and storage means to indicate the validity of data therein, each said control means being coupled to and responsive to the associated detecting means for enabling and disabling the associated gates, said detecting means being coupled in series to coordinate the operation of said control means.

18. Apparatus as claimed in claim 17, wherein said storage and logic means include means to represent and transmit data in digital form.

19. Apparatus as claimed in claim 18, wherein said storage and logic means constitute a double line system comprising components in which data is represented in true and complement forms.

20. Apparatus as claimed in claim 19, wherein said storage means are trigger circuits having two conditions which are adapted to represent the data.

21. Apparatus as claimed in claim 20, wherein said control means are trigger circuits.

22. Apparatus as claimed in claim 21, wherein each said flush and validity detecting means includes an exclusive minus-or circuit coupled to the associated logic means and being adapted to indicate the absence of both true and complement forms.

23. Apparatus as claimed in claim 22, wherein each said detecting means further includes a second exclusive minus-or circuit coupled to the associated logic means and storage means and adapted to indicate the presence therein of complement and true forms respectively.

24. Apparatus as claimed in claim 23, wherein each detecting means comprises a gate coupled to the exclusive minus-or circuits therein and to the first said exclusive minus-or circuit of the next sequential detecting means, the latter said gate being coupled to the associated control means.

25. Apparatus as claimed in claim 24, wherein the latter said gate is further coupled to the output gates of the preceding storage means to enable and disable the same.

26. Apparatus as claimed in claim 25, wherein said latter gate is further coupled to the control means associated with said preceding storage means to establish one of the conditions of the same.

27. A data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, a data source adapted for providing true and complementary data forms, third gating means coupled to said source and said first storage means for controlling the supply of data to the latter, third gating means coupled to said second storage means for controlling the transmission of data therefrom, first and second conrol triggers associated with the first and second storage means respectively, the first control trigger being coupled to the first and fourth gating means for enabling and disabling the same, said second control trigger being coupled to said second and third gating means for enabling and disabling the same, first detecting means coupled to said source and generating a signal upon the presence of true and complementary forms of data in said source, second detecting means coupled to said source and to said first storage means and generating a signal upon the receipt of valid data by said first storage means, third detecting means coupled to said logic circuits and generating a first signal upon the absence of data in said logic circuits and a second signal upon the presence of data therein, a gate coupled to said third detecting means and generating a signal to turn on the first control trigger in response to a signal received from said third detecting means, fourth detecting means coupled to the complementary logic circuit and to said second storage means and generating a signal when valid data is received by the second storage means, a second gate coupled to said third and fourth detecting means and generating a signal in response to the second signal of the third detecting means and to the signal of said fourth detecting means, said second control trigger being coupled to said second gate and being turned on by the signal generated thereby, the signal generated by said second gate turning off said first control trigger.

28. A data transmission system comprising first and second storage means adapted for storing data, true and complementary logic circuits, first gating means coupling said first storage means to said logic circuits for the transmission of data to the latter, second gating means coupling said logic circuits to said second storage means for the transmission of data to the latter, a data source adapted for providing true and complementary data forms, third gating means coupled to said source and said first storage means for controlling the supply of data to the latter, third gating means coupled to said second storage means for controlling the transmission of data therefrom, first and second control triggers associated with the first and second storage means respectively, the first control trigger being coupled to the first and fourth gating means for enabling and disabling the same, said second control trigger being coupled to said second and third gating means for enabling and disabling the same, first detecting means coupled to said source and generating a signal upon the presence of true and complementary forms of data in said source, second detecting means coupled to said source and to said first storage means and generating a signal upon the receipt of valid data by said first storage means, third detecting means coupled to said logic circuits and generating a first signal upon the absence of data in said logic circuits and a second signal upon the presence of data therein, a gate coupled to said third detecting means and generating a signal to turn on the first control trigger in response to a signal received from said third detecting means, the first control trigger when turned on enabling said first gating means and disabling said fourth gating means, fourth detecting means coupled to the complementary logic circuit and to said second storage means and generating a signal when valid data is received by the second storage means, a second gate coupled to said third and fourth detecting means and generating a signal in response to the second signal of the third detecting means and to the signal of said fourth detecting means, said second control trigger being coupled to said second gate and being turned on by the signal generated thereby, said second control trigger when on enabling said fourth gating means and disabling said second gating means, the signal generated by said second gate turning off said first control trigger.

29. Apparatus comprising first and second storage means adapted for storing data, non-oscillatory logic means, first gating means coupling said first storage means to said logic means for the transmission of data to the latter, second gating means coupling said logic means to said second storage means for the transmission of data to the latter, a data source adapted for providing true and complementary data forms, third gating means coupled to said source and said first storage means for controlling the supply of data to the latter, third gating means coupled to said second storage means for controlling the transmission of data therefrom, first and second control triggers associated with the first and second storage means respectively, the first control trigger being coupled to the first and fourth gating means for enabling and disabling the same, said second control trigger being coupled to said second and third gating means for enabling and disabling the same, a first exclusive-or-gate coupled to said source and generating a signal upon the presence of data in said source, a second exclusive-or-gate coupled to said source and to said first storage means and generating a signal upon the receipt of valid data by said first storage means, a third exclusive-or-gate coupled to said logic means and generating a first signal upon the absence of data in said logic means and a second signal upon the presence of data therein, a minus-and-gate coupled to said third exclusive-or-gate and generating a signal to turn on the first control trigger in response to a signal received from said third exclusive-or-gate, the first control trigger when turned on enabling said first gating means and disabling said fourth gating means, a fourth exclusive-or-gate coupled to the logic means and to said second storage means and generating a signal when valid data is received by the second storage means, a second minus-and-gate coupled to said third and fourth exclusive-or-gates and generating a signal in response to the second signal of the third exclusive-or-gate and to the signal of said fourth exclusive-or-gate, said second control trigger being coupled to said second minus-and-gate and being turned on by the signal generated thereby, said second control trigger when on enabling said fourth gating means and disabling said second gating means, the signal generated by said second minus-and-gate turning off said first control trigger.

30. An asynchronously controlled data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, a data source adapted for providing true and complementary data forms, third gating means coupled to said source and said first storage means for controlling the supply of data to the latter, third gating means coupled to said second storage means for controlling the transmission of data therefrom, first and second control triggers associated with the first and second storage means respectively, the first control trigger being coupled to the first and fourth gating means for enabling and disabling the same, said second control trigger being coupled to said second and third gating means for enabling and disabling the same, a first exclusive-or-gate coupled to said source and generating a signal upon the presence of true and complementary forms of data in said source, a second exclusive-or-gate coupled to said source and to said first storage means and generating a signal upon the receipt of valid data by said first storage means, a third exclusive-or-gate coupled to said logic circuits and generating a first signal upon the absence of data in said logic circuits and a second signal upon the presence of data therein, a minus-and-gate coupled to said third exclusive-or-gate and generating a signal to turn on the first control trigger in response to a signal received from said third exclusive-or-gate, the first control trigger when turned on enabling said first gating means and disabling said fourth gating means, a fourth exclusive-or-gate coupled to the complementary logic circuit and to said second storage means and generating a signal when valid data is received by the second storage means, a second minus-and-gate coupled to said third and fourth exclusive-or-gates and generating a signal in response to the second signal of the third exclusive-or-gate and to the signal of said fourth exclusive-or-gate, said second control trigger being coupled to said second minus-and-gate and being turned on by the signal generated thereby, said second control trigger when on enabling said fourth gating means and disabling said second gating means, the signal generated by said second minus-and-gate turning off said first control trigger.

31. An asynchronously controlled data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, third gating means coupling said first and second storage means for the transmission of data from the second storage means to the first storage means, a control trigger coupled to said first, second and third storage means for selectively enabling and disabling the same, a first exclusive-or-gate coupled to said first and second storage means and generating a signal when said storage means are storing like data, a second exclusive-or-gate coupled to said true and complementary logic circuits and generating a first signal when data is absent from said logic circuits and a second signal when data is present in said logic circuits, a third exclusive-or-gate coupled to the complementary logic circuit and to said second storage means and generating a signal when the data received by the second storage means is valid, a minus-and-gate coupled to said first and second exclusive-or-gates and generating a signal in response to the first signal received from the second exclusive-or-gate and the signal received from the first exclusive-or-gate, said control trigger being coupled to said minus-and-gate and being turned on by the signal received therefrom, and a second minus-and-gate coupled to said second and third exclusive-or-gates and being responsive to said second signal generated by said second exclusive-or-gate and to the signal generated by said third exclusive-or-gate for generating a signal, said control trigger being coupled to said second minus-and-gate and being responsive to the signal generated thereby for being turned off, said control trigger when turned on enabling said first and second gating means and disabling said third gating means, said control trigger when turned off disabling said first and second gating means and enabling said third gating means.

32. Apparatus comprising first and second storage means adapted for storing data, non-oscillatory logic means, first gating means coupling said first storage means to said logic means for the transmission of data to the latter, second gating means coupling said logic means to said second storage means for the transmission of data to the latter, third gating means coupling said first and second storage means for the transmission of data from the second storage means to the first storage means, a control trigger coupled to said first, second and third storage means for selectively enabling and disabling the same, a first exclusive-or-gate coupled to said first and second storage means and generating a signal when said storage means are storing like data, a second exclusive-or-gate coupled to said logic means and generating a first signal when data is absent from said logic means and a second signal when data is present in said logic means, a third exclusive-or-gate coupled to the logic means and to said second storage means and generating a signal when the data received by the second storage means is valid, a minus-and-gate coupled to said first and second exclusive-or-gates and generating a signal in response to the first signal received from the second exclusive-or-gate and the signal received from the first exclusive-or-gate, said control trigger being coupled to said minus-and-gate and being turned on by the signal received therefrom, and a second minus-and-gate coupled to said second and third exclusive-or-gates and being responsive to said second signal generated by said second exclusive-or-gate and to the signal generated by said third exclusive-or-gate for generating a signal, said control trigger being coupled to said second minus-and-gate and being responsive to the signal generated thereby for being turned off, said control trigger when turned on enabling said first and second gating means and disabling said third gating means, said control trigger when turned off disabling said first and second gating means and enabling said third gating means.

33. A data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, third gating means coupling said first and second storage means for the transmission of data from the second storage means to the first storage means, a control trigger coupled to said first, second and third storage means for selectively enabling and disabling the same, first detecting means coupled to said first and second storage means and generating a signal when said storage means are storing like data, second detecting means coupled to said true and complementary logic circuits and generating a first signal when data is absent from said logic circuits and a second signal when data is present in said logic circuits, third detecting means coupled to the complementary logic circuit and to said second storage means and generating a signal when the data received by the second storage means is valid, a minus-and-gate coupled to said first and second detecting means and generating a signal in response to the first signal received from the second detecting means and the signal received from the second detecting means and the signal received from the first detecting means, said control trigger being coupled to said minus-and-gate and being turned on by the signal received therefrom, and a second minus-and-gate coupled to said second and third detecting means and being responsive to said second signal generated by said second detecting means and to the signal generated by said third detecting means for generating a signal, said control trigger being coupled to said second minus-and-gate and being responsive to the signal generated thereby for being turned off, said control trigger when turned on enabling said first and second gating means and disabling said third gating means, said control trigger when turned off disabling said first and second gating means and enabling said third gating means.

34. An asynchronously controlled data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, third gating means coupling said first and second storage means for the transmission of data from the second storage means to the first storage means, a control trigger coupled to said first, second and third storage means for selectively enabling and disabling the same, first detecting means coupled to said first and second storage means and generating a signal when said storage means are storing like data, second detecting means coupled to said true and complementary logic circuits and generating a first signal when data is absent from said logic circuits and a second signal when data is present in said logic circuits, third detecting means coupled to the complementary logic circuit and to said second storage means and generating a signal when the data received by the second storage means is valid, a gate coupled to said first and second detecting means and generating a signal in response to the first signal received from the second detecting means and the signal received from the first detecting means, said control trigger being coupled to said gate and being turned on by the signal received therefrom, and a second gate coupled to said second and third detecting means and being responsive to said second signal generated by said second detecting means and to the signal generated by said third detecting means for generating a signal, said control trigger being coupled to said second gate and being controlled by the signal generated thereby.

35. An asynchronously controlled data transmission system comprising first and second storage means adapted for storing said data, true and complementary logic circuits, first gating means coupling said first storage means to said logic circuits for the transmission of data to the latter, second gating means coupling said logic circuits to said second storage means for the transmission of data to the latter, third gating means coupling said first and second storage means for a transmission of data from the second storage means to the first storage means, a control trigger coupled to said first, second and third storage means for selectively enabling and disabling the same, a first exclusive-or-gate coupled to said first and second storage means and generating a signal when said storage means are storing like data, a second exclusive-or-gate coupled to said true and complementary logic circuits and generating a first signal when data is absent from said logic circuits and a second signal when data is present in said logic circuits, a third exclusive-or-gate coupled to the complementary logic circuit and to said second storage means and generating a signal when the data received by the second storage means is valid, a minus-and-gate coupled to said first and second exclusive-or-gates and generating a signal in response to the first signal received from the second exclusive-or-gate and the signal received from the first exclusive-or-gate, said control trigger being coupled to said minus-and-gate and being turned on by the signal received therefrom, and a second minus-and-gate coupled to said second and third exclusive-or-gates and being responsive to said second signal generated by said second exclusive-or-gate and to the signal generated by said third exclusive-or-gate for generating a signal, said control trigger being coupled to said second gate and being controlled by the signal generated thereby.

36. An asynchronously controlled data transmission system comprising first and second storage means adapted for storing said data, true and complementary logic circuits, first gating means coupling said first storage means to said logic circuits to control the transmission of data from the first storage means to said logic circuits, second gating means coupling said logic circuits to said second storage means for controlling the transmission of data from said logic circuits to said second storage means, a data source, third gating means coupling said source to said first storage means for the transmission of data to said first storage means, fourth gating means coupled to said second storage means to control the transmission of data from said second storage means, first and second control triggers associated with said first storage means, third and fourth control triggers associated with said second storage means, a first exclusive-or-gate coupled to said data source and generating a first output signal when data is present at said source and a second output signal when data is absent at said source, a second exclusive-or-gate coupled to said source and to said first storage means and generating a signal when valid data is received in said first storage means, a third exclusive-or-gate coupled to said logic circuits and generating a first output signal when data is present in said logic circuits and a second output signal when data is absent from said logic circuits, a fourth exclusive-or-gate coupled to said complementary logic circuit and to said second storage means and generating an output signal when valid data has been received by said second storage means, a first minus-and-gate coupled to said first exclusive-or-gate and responsive so said first output signal generated thereby to generate a signal indicating the absence of data at said source, a second minus-and-gate coupled to said first and second exclusive-or-gates and responsive to the second signal generated by first said exclusive-or-gate and a signal generated by said second exclusive-or-gate for generating a signal to turn on said first and second control triggers, a third minus-and-gate coupled to said third exclusive-or-gate and responsive to the second signal generated thereby to generate a signal which is transmitted to said first and second control triggers to turn the same on in cooperation with the signal generated by said second minus-and-gate, and a fourth minus-and-gate coupled to said third and fourth exclusive-or-gates and responsive to the first signal generated by said third exclusive-or-gate and to the signal generated by said fourth exclusive-or-gate for generating a signal, said third and fourth control triggers being coupled to said fourth minus-and-gate and being turned on by the signal generated thereby, said first control trigger being coupled to said third gating means and enabling the same when turned on, said second control trigger being coupled to said first gating means and enabling the same when turned on, said third control trigger being coupled to said second gating means and enabling the same when turned on, said fourth control trigger being coupled to said fourth gating means and enabling the same when turned on, said first and third control triggers being coupled to said first and second storage means and being responsive to an absence of data in the same for being turned off, said third control trigger being coupled to said fourth minus-and-gate and being turned off by the signal generated thereby.

37. A data transmission system comprising first and second storage means adapted for storing said data, logic circuits, first gating means coupling said first storage means to said logic circuits to control the transmission of data from the first storage means to said logic circuits, second gating means coupling said logic circuits to said second storage means for controlling the transmission of data from said logic circuits to said second storage means, a data source, third gating means coupling said source to said first storage means for the transmission of data to said first storage means, fourth gating means coupled to said second storage means to control the transmission of data from said second storage means, first and second control triggers associated with said first storage means, third and fourth control triggers associated with said second storage means, first detecting means coupled to said data source and generating a first output signal when data is present at said source and a second output signal when data is absent at said source, second detecting means coupled to said source and to said first storage means and generating a signal when valid data is received in said first storage means, third detecting means coupled to said logic circuits and generating a first output signal when data is present in said logic circuits and a second output signal when data is absent from said logic circuits, fourth detecting means coupled to said logic circuits and to said second storage means and generating an output signal when valid data has been received by said second storage means, a first gate coupled to said first detecting means and responsive to said first output signal generated thereby to generate a signal indicating the absence of data at said data source, a second gate coupled to said first and second detecting means and responsive to the second signal generated by first said detecting means and a signal generated by said second detecting means for generating a signal to turn on said first and second control triggers, a third gate coupled to said third detecting means and responsive to the second signal generated thereby to generate a signal which is transmitted to said first and second control triggers to turn the same on in cooperation with the signal generated by said second gate, and a fourth gate coupled to said third and fourth detecting means and responsive to the first signal generated by said third detecting means and to the signal generated by said fourth detecting means for generating a signal, said third and fourth control triggers being coupled to said fourth gate and being turned on by the signal generated thereby, said first control trigger being coupled to said third gating means and enabling the same when turned on, said second control trigger being coupled to said first gating means and enabling the same when turned on, said third control trigger being coupled to said second gating means and enabling the same when turned on, said fourth control trigger being coupled to said fourth gating means and enabling the same when turned on, said first and third control triggers being coupled to said first and second storage means and being responsive to an absence of data in the same for being turned off, said third control trigger being coupled to said fourth gate and being turned off by the signal generated thereby.

38. Apparatus comprising first and second storage means adapted for storing said data, non-oscillatory logic circuits, first gating means coupling said first storage means to said logic circuits to control the transmission of data from the first storage means to said logic circuits, second gating means coupling said logic circuits to said second storage means for controlling the transmission of data from said logic circuits to said second storage means, a data source, third gating means coupling said source to said first storage means for the transmission of data to said first storage means, fourth gating means coupled to said second storage means to control the transmission of data from said second storage means, first and second control triggers associated with said first storage means, third and fourth control triggers associated with said second storage means, first detecting means coupled to said data source and generating a first output signal when data is present at said source and a second output signal when data is absent at said source, second detecting means coupled to said source and to said first storage means and generating a signal when valid data is received in said first storage means, third detecting means coupled to said logic circuits and generating a first output signal when data is present in said logic circuits and a second output signal when data is absent from said logic circuits, fourth detecting means coupled to said logic circuits and to said second storage means and generating an output signal when valid data has been received by said second storage means, a first gate coupled to said first detecting means and responsive to said first output signal generated thereby to generate a signal indicating the absence of data at said data source, a second gate coupled to said first and second detecting means and responsive to the second signal generated by first said detecting means and a signal generated by said second detecting means for generating a signal to turn on said first and second control triggers, a third gate coupled to said third detecting means and responsive to the second signal generated thereby to generate a signal which is transmitted to said first and second control triggers to turn the same on in cooperation with the signal generated by said second gate, and a fourth gate coupled to said third and fourth detecting means and responsive to the first signal generated by said third detecting means and to the signal generated by said fourth detecting means for generating a signal, said third and fourth control triggers being coupled to said fourth gate and being turned on by the signal generated thereby, said control triggers being coupled to said gating means and controlling the same, said first and third control triggers being coupled to said first and second storage means and being responsive to an absence of data in the same for being turned off, said third control trigger being coupled to said fourth gate and being turned off by the signal generated thereby.

39. Apparatus comprising first and second storage means adapted for storing said data, logic circuits, first gating means coupling said first storage means to said logic circuits to control the transmission of data from the first storage means to said logic circuits, second gating means coupling said logic circuits to said second storage means for controlling the transmission of data from said logic circuits to said second storage means, a data source, third gating means coupling said source to said first storage means for the transmission of data to said first storage means, fourth gating means coupled to said second storage means to control the transmission of data from said second storage means, first and second control triggers associated with said first storage means, third and fourth control triggers associated with said second storage means, first detecting means coupled to said data source and generating a first output signal when data is present at said source and a second output signal when data is absent at said source, second detecting means coupled to said source and to said first storage means and generating a signal when valid data is received in said first storage means, third detecting means coupled to said logic circuits and generating a first output signal when data is present in said logic circuits and a second output signal when data is absent from said logic circuits, fourth detecting means coupled to said logic circuits and to said second storage means and generating an output signal when valid data has been received by said second storage means, a first gate coupled to said first detecting means and responsive to said first output signal generated thereby to generate a signal indicating the absence of data at said data source, a second gate coupled to said first and second detecting means and responsive to the second signal generated by first said detecting means and a signal generated by said second detecting means for generating a signal to turn on said first and second control triggers, a third gate coupled to said third detecting means and responsive to the second signal generated thereby to generate a signal which is transmitted to said first and second control triggers to turn the same on in cooperation with the signal generated by said second gate, and a fourth gate coupled to said third and fourth detecting means and responsive to the first signal generated by said third detecting means and to the signal generated by said fourth detecting means for generating a signal, said third and fourth control triggers being coupled to said fourth gate and being turned on by the signal generated thereby, said control triggers being coupled to said gating means and controlling the same.

References Cited in the file of this patent

UNITED STATES PATENTS

| | | |
|---|---|---|
| 2,840,305 | Williams et al. | June 24, 1958 |
| 2,845,222 | Genna et al. | July 29, 1958 |
| 2,879,001 | Weinberger et al. | Mar. 24, 1959 |
| 2,891,723 | Newman et al. | June 23, 1959 |